United States Patent

Sasata

(10) Patent No.: US 8,114,326 B2
(45) Date of Patent: Feb. 14, 2012

(54) CELLULOSE ESTER FILM, POLARIZING PLATE, LIQUID CRYSTAL DISPLAY AND PROCESS FOR PRODUCING CELLULOSE ESTER FILM

(75) Inventor: Katsumi Sasata, Minami-Ashigara (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 1063 days.

(21) Appl. No.: 11/942,905

(22) Filed: Nov. 20, 2007

(65) Prior Publication Data

US 2008/0118668 A1    May 22, 2008

(30) Foreign Application Priority Data

Nov. 21, 2006    (JP) ................... 2006-313958

(51) Int. Cl.
*B29C 55/00*    (2006.01)
(52) U.S. Cl. ..... 264/216; 264/217; 264/234; 264/288.4; 264/288.8; 264/212
(58) Field of Classification Search .......... 264/216, 264/217, 234, 288.4, 288.8, 290.2, 212
See application file for complete search history.

(56) References Cited

U.S. PATENT DOCUMENTS

| | | | |
|---|---|---|---|
| 5,583,679 A | 12/1996 | Ito et al. | |
| 2003/0156235 A1 | 8/2003 | Kuzuhara et al. | |
| 2007/0092663 A1* | 4/2007 | Murakami | 428/1.31 |
| 2009/0142515 A1* | 6/2009 | Nakamura et al. | 428/1.31 |

FOREIGN PATENT DOCUMENTS

| | | |
|---|---|---|
| EP | 0 911 656 (A2) | 4/1999 |
| JP | 2587398 (B2) | 3/1997 |
| JP | 2002-071957 (A) | 3/2002 |
| JP | 2003-066230 A | 3/2003 |
| JP | 2003-270442 (A) | 9/2003 |
| JP | 2004-010763 A | 1/2004 |
| JP | 2005-330411 A | 12/2005 |
| JP | 2006-257202 A | 9/2006 |
| JP | 2006-299114 A | 11/2006 |

OTHER PUBLICATIONS

Office Action (Notification of Reasons for Refusal) issued by the Japanese Patent Office issued in corresponding Japanese Patent Application No. 2007-299206 dated Dec. 13, 2011, with an English translation thereof.

* cited by examiner

*Primary Examiner* — Christina Johnson
*Assistant Examiner* — Saeed Huda
(74) *Attorney, Agent, or Firm* — Buchanan Ingersoll & Rooney PC

(57) ABSTRACT

A cellulose ester film has a front retardation Re of from 20 nm to 100 nm relative to light having a wavelength of 590 nm at 25° C. and 60% RH; a retardation Rth in a film thickness direction of from 60 nm to 400 nm relative to light having a wavelength of 590 nm at 25° C. and 60% RH; and a shrinkage factor in a slow axis direction of less than 1% in the range of from a glass transition temperature to a temperature of 40° C. higher than a glass transition temperature.

5 Claims, No Drawings

CELLULOSE ESTER FILM, POLARIZING PLATE, LIQUID CRYSTAL DISPLAY AND PROCESS FOR PRODUCING CELLULOSE ESTER FILM

FIELD OF THE INVENTION

The present invention relates to a cellulose ester film, a polarizing plate and a liquid crystal display each using the same and a process for producing a cellulose ester film.

BACKGROUND OF THE INVENTION

A liquid crystal display is widely utilized in monitors of personal computers and mobile appliances and applications for TV because of various advantages that downsizing and thinning can be achieved at low voltage and low electric power consumption. In such a liquid crystal display, various modes are proposed depending upon an alignment state of liquid crystal molecules within a liquid crystal cell. A TN mode taking a twisted alignment state of about 90° toward an upper substrate from a lower substrate of the liquid crystal cell has hitherto been the mainstream.

In general, a liquid crystal display is configured of an optical compensation sheet and a polarizer. The optical compensation sheet is used for the purpose of overcoming image coloration or enlarging a viewing angle, and a stretched birefringent film or a film having a liquid crystal coated on a transparent film is used. For example, Japanese Patent No. 2587398 (corresponding to U.S. Pat. No. 5,583,679) discloses a technology for applying an optical compensation sheet in which a discotic liquid crystal is coated, oriented and immobilized on a triacetyl cellulose film to a liquid crystal cell of TN mode and enlarging a viewing angle.

However, in a liquid crystal display for television applications in which it is supposed that a person looks from various angles in a large-sized screen, demands for the viewing angle dependency are severe. Even by the foregoing method, these demands cannot be satisfied. For that reason, liquid crystal displays different from the TN mode, for example, an IPS (in-plane switching) mode, an OCB (optically compensatory bend) mode and a VA (vertically aligned) mode are studied. In particular, the VA mode is watched as a liquid crystal display for TV because it is high in contrast and relatively high in manufacture yield.

Now, a cellulose ester film is characterized in that its optical isotropy is high (low in a retardation value) as compared with other polymer films. Accordingly, it is general that the cellulose ester film is used for applications in which optical isotropy is required, for example, a polarizing plate.

On the other hand, an optical compensation sheet (phase difference film) of the liquid crystal display is inversely required to have optical anisotropy (high retardation value). In particular, it is considered that an optical compensation sheet for VA mode is required to have a front retardation (Re) of from 30 to 200 nm and a retardation (Rth) in a film direction of from 70 to 400 nm. Accordingly, it was general that a synthetic polymer film having a high retardation value, such as polycarbonate films and polysulfone films, is used as the optical compensation sheet.

In the foregoing technical field of optical materials, it was a general rule that when the polymer film is required to have optical anisotropy (high retardation value), a synthetic polymer film is used, whereas when the polymer film is required to have optical isotropy (low retardation value), a cellulose ester film is used.

European Patent No. 0911656A2 proposes a cellulose ester film having a high retardation value, which overturns the conventional general rule and is able to be used for applications requiring optical anisotropy. In this proposal, in order to realize a high retardation value in cellulose triacetate, a stretching treatment is carried out by adding an aromatic compound having at least two aromatic rings, especially a compound having a 1,3,5-triazine ring. In general, it is known that cellulose triacetate is a hardly stretchable, high-molecular weight raw material and is difficult to make the birefringence large. However, by simultaneously orienting the additive in the stretching treatment, it becomes possible to make the birefringence large, thereby realizing a high retardation value. Since this film is also able to work as a passivation film for polarizing plate, there is brought an advantage that an inexpensive and thin liquid crystal display can be provided.

JP-A-2002-71957 discloses an optical film containing a cellulose ester which has an acyl group having from 2 to 4 carbon atoms as a substituent and which, when a degree of substitution of an acetyl group is defined as A and a degree of substitution of a propionyl group or a butyryl group is defined as B, is simultaneously satisfied with relationships of $\{2.0 \leq (A+B) \leq 3.0\}$ and $\{A<2.4\}$, wherein a refractive index Nx in a slow axis direction and a refractive index Ny in a fast axis direction at a wavelength of 590 nm are satisfied with a relationship of $\{0.0005 \leq (Nx-Ny) \leq 0.0050\}$.

JP-A-2003-270442 (corresponding to US2003/0156235A1) discloses a polarizing plate to be used for a VA mode liquid crystal display having a polarizer and an optically biaxial mixed fatty acid cellulose ester film, wherein the optically biaxial mixed fatty acid cellulose ester film is arranged between a liquid crystal cell and the polarizer.

SUMMARY OF THE INVENTION

The methods disclosed in the foregoing patent documents are effective in view of the matter that an inexpensive and thin liquid crystal display is obtainable. However, in recent years, liquid crystal displays are frequently used under various circumstances, for example, a high-humidity circumstance and a high-temperature circumstance. In the cellulose ester films employing the foregoing technologies, there was a problem that an optical compensation function is reduced under such a circumstance.

For that reason, the development of a film which is low in change in the optical compensation function to be caused due to such a circumstance and from which an inexpensive and thin liquid crystal display is obtainable was demanded.

In particular, for the purpose of making a cellulose ester film also work as a passivation film for polarizing plate, the durability against heat and humidity such that separation between a polarizing plate and a glass substrate of a liquid crystal cell to be caused due to, for example, shrinkage or deterioration by moisture absorption of a polarizer and deterioration of an adhesive layer under a high-temperature and high-humidity condition is prevented is especially important. In addition, higher transparency, strength and handling properties and the like are required. In particular, the cellulose ester films described in JP-A-2002-71957 and JP-A-2003-270442 (corresponding to US2003/0156235A1) are large in dimensional change in a stretching direction. Also, in polarizing plates using such a cellulose ester film as a passivation film having a compensation function for the viewing angle of a liquid crystal cell, the matter that sticking failure in a step of sticking the polarizing plate to the liquid crystal cell is easily caused has become problematic.

In view of the foregoing problems, the invention has been made. An object of the invention is to provide an optical film which is excellent in developing properties of front retardation and retardation in a film thickness direction and which is small in fluctuation in optical compensation performance to be caused due to the circumstance and simultaneously to provide a cellulose ester film which is excellent in dimensional stability and which does not cause failure in a sticking step to a liquid crystal cell, a polarizing plate and a liquid crystal display each using the same and a process for producing the same.

The present inventors made extensive and intensive investigations. As a result, it has been found that in a process for producing a cellulose ester film including the steps of casting a solution of a cellulose ester dissolved in an organic solvent on a support and evaporating the solvent to form a cellulose ester film and stretching the film in a width direction, at the stage of casting the cellulose ester solution and evaporating the solvent to form a cellulose ester film, when the amount of the residual solvent in the cellulose ester film is in the range of not more than 2% by mass, the foregoing problems can be achieved by heat treating the film at a temperature of from 130 to 200° C. for one minute or more. As a result of further investigations, it has been found that the foregoing problems can be achieved by controlling a shrinkage factor in a slow axis direction at less than 1% in the range of from a glass transition temperature to a temperature of 40° C. higher than a glass transition temperature by the foregoing heat treatment, leading to accomplishment of the invention.

That is, according to the invention, an optical cellulose ester film having the following configuration, a polarizing plate and a liquid crystal display each using the same and a process for producing the same are provided, thereby achieving the foregoing object of the invention.

[1] A cellulose ester film having a front retardation Re of from 20 nm to 100 nm relative to light having a wavelength of 590 nm at 25° C. and 60% RH; a retardation Rth in a film thickness direction of from 60 nm to 400 nm relative to light having a wavelength of 590 nm at 25° C. and 60% RH; and a shrinkage factor in a slow axis direction of less than 1% in the range of from a glass transition temperature to a temperature of 40° C. higher than a glass transition temperature.

[2] The cellulose ester film as set forth above in [1], wherein the cellulose ester film has an acyl group having from 2 to 4 carbon atoms as a substituent and, when a degree of substitution of an acetyl group is defined as DSA and a degree of substitution of a propionyl group or a butyryl group is defined as DSB, is satisfied with a relationship of $\{2.0 \leqq (DSA+DSB) \leqq 2.9\}$.

[3] The cellulose ester film as set forth above in [2], wherein the cellulose ester film has an acyl group having from 2 to 4 carbon atoms as a substituent and, when a degree of substitution of an acetyl group is defined as DSA and a degree of substitution of a propionyl group or a butyrl group is defined as DSB, is satisfied with relationships of $\{2.0 \leqq (DSA+DSB) \leqq 2.9\}$ and $\{0.4 \leqq DSB \leqq 1.0\}$.

[4] The cellulose ester film as set forth above in any one of [1] to [3], which is composed of a cellulose ester film containing an aliphatic polyhydric alcohol ester formed of an aliphatic polyhydric alcohol and one or more kinds of a monocarboxylic acid.

[5] The cellulose ester film as set forth above in any one of [1] to [4], which contains at least one kind of a retardation developing agent composed of a rod-like or disc-like compound.

[6] The cellulose ester film as set forth above in any one of [1] to [5], wherein the film has a thickness of from 20 to 100 μm.

[7] A polarizing plate comprising the cellulose ester film as set forth above in any one of [1] to [6] stuck onto at least one surface of a polarizer or a polarizing plate.

[8] A liquid crystal display using the cellulose ester film as set forth above in any one of [1] to [6] or the polarizing plate as set forth above in [7].

[9] A process for producing a cellulose ester film comprising a fabrication step of casting a solution having a cellulose ester dissolved in an organic solvent on a support and evaporating the solvent to form a cellulose ester film; a stretching step of subsequently stretching the film; and a drying step of drying the resulting film, which further includes a step of, after completion of the drying step, performing a heat treatment at a temperature of from 150 to 200° C. for one minute or more.

[10] The process for producing a cellulose ester film as set forth above in [9], wherein a stretch ratio of the film in the stretching step is from 1.2 to 2.0 times.

[11] The process for producing a cellulose ester film as set forth above in [9] or [10], wherein in the heat treatment step, the film is stretched from 0.9 to 1.5 times in a width direction and a traveling direction of the film, respectively.

The cellulose ester film of the invention is excellent in developing properties of front (in-plane) retardation and retardation in a film thickness (thickness) direction, small in fluctuation in optical compensation performance to be caused due to the circumstance and excellent in dimensional stability at high temperature and high humidity. Also, by using the polarizing plate of the invention, it is possible to reduce a loss of the polarizing plate to be caused due to sticking failure and a loss of a liquid crystal panel manufacture time to be caused due to the recommencement of sticking works of the polarizing plate.

DETAILED DESCRIPTION OF THE INVENTION

The invention is concerned with a cellulose ester film having a front retardation Re of from 20 nm to 100 nm relative to light having a wavelength of 590 nm at 25° C. and 60% RH; a retardation Rth in a film thickness direction of from 60 nm to 400 nm relative to light having a wavelength of 590 nm at 25° C. and 60% RH; and a shrinkage factor in a slow axis direction of less than 1% in the range of from a glass transition temperature to a temperature of 40° C. higher than a glass transition temperature.

(Measurement of Retardation)

In this specification, $Re(\lambda)$ and $Rth(\lambda)$ represent an in-plane retardation and a retardation in a thickness direction at a wavelength of $\lambda$, respectively. The $Re(\lambda)$ is measured by making light having a wavelength of $\lambda$ nm incident in a film normal direction in KOBRA 21ADH or WR (all of which are manufactured by Oji Scientific Instruments).

In the case where the film to be measured is represented by a uniaxial or biaxial refractive index ellipsoid, the $Rth(\lambda)$ is calculated in the following manner.

With respect to the $Rth(\lambda)$, the $Re(\lambda)$ is measured in 6 points in total by forming an in-plane slow axis (judged by KOBRA 21ADH or WR) as an axis of tilt (rotating axis) (in the case where no slow axis exists, an arbitrary direction in the plane is formed as a rotating axis) and making light having a wavelength of $\lambda$ nm incident from an inclined direction at a step of every 10° to 50° on one side from a normal direction to the film normal direction, and the Rth is calculated by KOBRA 21ADH or WR on the basis of a measured retardation value, a hypothesized value of average refractive index and an inputted film thickness value.

In the foregoing, in the case of a film having a direction where a retardation value is zero at a certain tilt angle from the normal direction while forming the in-plane slow axis as a rotating axis, a retardation value at a title angle larger than this tilt angle is changed with a negative symbol, and the Rth is calculated by KOBRA 21ADH or WR.

The Rth can also be calculated according to the following numerical expressions (1) and (2) by forming the slow axis as an axis of tilt (rotating axis) (in the case where no slow axis exists, an arbitrary direction in the plane is formed as a rotating axis), measuring retardation values from two arbitrary inclined direction and making the measured values hypothesized value of average refractive index and an inputted film thickness value as a basis.

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Numerical Expression (1)

In the numerical expression (1), $Re(\theta)$ represents a retardation value in a direction inclined at an angle of $\theta$ from the normal direction.

In the numerical expression (1), nx represents a refractive index in the slow axis direction in the plane; ny represents a refractive index in a direction perpendicular to nx in the plane; nz represents a refractive index in a direction perpendicular to nx and ny; and d represents a thickness of the film.

$$Rth = \left(\frac{nx + ny}{2} - nz\right) \times d$$

Numerical Expression (2)

In the case of a film which cannot be represented by a uniaxial or biaxial refractive index ellipsoid, namely a so-called optic axis-free film, the $Rth(\lambda)$ is calculated in the following manner.

The $Re(\lambda)$ is measured in 11 points by forming an in-plane slow axis (judged by KOBRA 21ADH or WR) as an axis of tilt (rotating axis) and making light having a wavelength of $\lambda$ nm incident from an inclined direction at a step of every 10° from −50° to 50° against the film normal direction, and the Rth is calculated by KOBRA 21ADH or WR on the basis of a measured retardation value, a hypothesized value of average refractive index and an inputted film thickness value.

In the foregoing measurement, as the hypothesized value of average refractive index, values described in *Polymer Handbook* (John Wiley & Sons, Inc.) and catalogues of various optical films can be employed. When a value of average refractive index is not known, it can be measured by an ABBE's refractometer. Values of average refractive index of major optical films are enumerated as follows: cellulose acylate (1.48), cycloolefin polymer (1.52), polycarbonate (1.59), polymethyl methacrylate (1.49) and polystyrene (1.59). By inputting such a hypothesized value of average refractive index and a thickness of the film, nx, ny and nz are computed by KOBRA 21ADH or WR. {Nz=(nx−nz)/(nx−ny)} is further calculated from the thus calculated nx, ny and nz.

With respect to $Re(\lambda)$ and $Rth(\lambda)$ of the cellulose ester film of the invention at 25° C. and 60% RH, Re (590) and Rth (590) are preferably from 30 nm to 80 nm and from 90 nm to 270 nm, respectively; and Re(590) and Rth(590) are more preferably from 40 nm to 70 nm and from 100 nm to 220 nm, respectively.

In the cellulose ester film of the invention, scatter in the Re value in a slow axis direction (width direction) is preferably ±5 nm, and more preferably ±3 nm. Also, scatter in the Rth value in a slow axis direction (width direction) is preferably ±10 nm, and more preferably ±5 nm. Also, it is preferable that scatters in the Re value and the Rth value in a length direction fall within the same ranges of those in the width direction, respectively.

(Measurement of Glass Transition Temperature)

After humidifying a film sample (5 mm×30 mm) at 25° C. and 60% RH for 2 hours or more, the glass transition temperature is measured by using a dynamic viscoelasticity meter (Vibron DVA-2255, manufactured by IT Keisoku Seigyo Co., Ltd.) at a grasping distance of 20 mm and a temperature rise rate of 2° C./min in the measurement temperature range of from 30° C. to 200° C. at a frequency of 1 Hz. By plotting a storage elastic modulus on the logarithmic ordinate and a temperature (° C.) on the linear abscissa, respectively, a straight line 1 indicating a sudden reduction of storage elastic modulus developed when the sample shows transition from a solid region to a glass transition region is drawn in the solid material region. A straight line 2 is drawn in the glass transition region. A point of crossing of the straight line 1 and the straight line 2 is defined as a glass transition temperature because it is a temperature at which the storage elastic modulus suddenly reduces at the temperature rise, whereby the film starts to soften and is a temperature at which the sample starts to show transition to the glass transition region.

(Measurement of Shrinkage Factor)

After humidifying a film sample (3 mm×35 mm) at 25° C. and 60% RH for 2 hours or more, the film length is measured every 10 seconds by using a thermo mechanical analyzer/stress strain, TMA/SS6100 (manufactured by SII Nano Technology Inc.) at a grasping distance of 25 mm and a temperature rise rate of 5° C./min in the measurement temperature range of from 30° C. to 200° C. at a load of 0.04 N, whereby the shrinkage factor (%) at each temperature can be calculated according to the following expression.

[{(Film length at a glass transition temperature)−
(Minimum film length in the range of from a
glass transition temperature to a temperature of
40° C. higher than a glass transition
temperature)}/(Film length before measurement)]×100

The cellulose ester film of the invention has a shrinkage factor in a slow axis direction of less than 1% in the range of from a glass transition temperature to a temperature of 40° C. higher than a glass transition temperature. By controlling the shrinkage factor at less than 1%, it is possible to provide a film which is able to enhance the durability against heat and humidity and is small in a reduction of the optical compensation performance to be caused due to the circumstance.

A haze value of the cellulose ester film of the invention is preferably not more than 1.0%, more preferably not more than 0.5%, and especially preferably 0 or more and less than 0.1%. A transmittance of the cellulose ester film of the invention is preferably 90% or more, and especially preferably 92% or more.

The thickness of the cellulose ester film of the invention is in the range of from 5 to 500 μm. When the cellulose ester film is used as a passivation film for polarizing plate, the film thickness is preferably in the range of from 20 to 100 μm from the standpoints of, for example, dimensional stability and water barrier properties of the polarizing plate. The thickness of the cellulose ester film is more preferably from 30 to 90 μm, and further preferably from 40 to 60 μm. Also, when the cellulose ester film is used as a rolled film, a fluctuation in the film thickness in each of a longitudinal direction and a width direction is preferably within ±3%, more preferably within ±1%, and especially preferably within ±0.1%.

From the standpoint of minimizing a change in color taste with time of the liquid crystal display, it is preferable that the cellulose ester film of the invention has a difference ΔRe between an Re(λ) value at 25° C. and 10% RH and an Re(λ) value at 25° C. and 80% RH {Re(590) (10% RH)–Re(590) (80% RH)} of from 0 nm to 5 nm and a difference ΔRth between an Rth(λ) value at 25° C. and 10% RH and an Rth(λ) value at 25° C. and 80% RH {Rth(590) (10% RH)–Rth(590) (80% RH)} of from 0 nm to 15 nm.

The measurement of a moisture content can be carried out in the Karl Fischer's method by measuring a sample (7 mm×35 mm) of the cellulose ester film of the invention by using a coulometric titrator and a sample dryer (AQUA-COUNTER AQ-200 and LE-20S, all of which are manufactured by Hiranuma Sangyo Co., Ltd.). The moisture content is calculated by dividing a water content (g) by a sample mass (g).

An equilibrium moisture content of the cellulose ester film of the invention at 25° C. and 80% RH is preferably from 0 to 5%, more preferably from 0.1 to 3.5%, and especially preferably from 1 to 3%. What the equilibrium moisture content exceeds 5% is not preferable because when used as a support of an optical compensation film, the dependency of the retardation by the change in humidity is large so that the optical compensation performance is reduced.

The measurement of a water vapor transmission ratio was carried out by using an analyzer which is satisfied with the requirements of JIS Z0208.

(Cup Method)

About 10 g of calcium chloride was charged in a vessel, and after allowing the vessel to stand for 24 hours under a circumstance of the outside of the vessel at 60° C. and 95% RH, an increase in weight of the whole of the vessel was measured [(Increase in weight)={(Weight after humidification)–(Weight before humidification)}]. In addition, a water permeation permeability per unit area (g/m²/24 h) was calculated by dividing the increase in weight by an area of an opening. Here, the size of the film sample was set up at 70 mmφ, and the opening of the vessel for analysis was set up at 60 mmφ.

When the cellulose ester film of the invention is used as a passivation film for polarizing plate, in order that the adhesiveness to a water-soluble polymer such as polyvinyl alcohol may not be impaired, the water vapor transmission ratio of the cellulose ester film is preferably from 400 to 2,000 g/m²/24 h, more preferably from 500 to 1,800 g/m²/24 h, and especially preferably from 600 to 1,600 g/m²/24 h. When the water vapor transmission ratio of the cellulose ester film exceeds 2,000 g/m²/24 h, the retardation of the film becomes large in the amount of change to be caused due to influences of the humidity, and its optical compensation performance is reduced. On the other hand, when the water vapor transmission ratio of the cellulose ester film is less than 400 g/m²/24 h, in preparing a polarizing plate by sticking the cellulose ester film to both surfaces of a polarizing film, drying of an adhesive is disturbed by the cellulose ester film whereby adhesive failure is caused.

A coefficient of dimensional change of the cellulose ester film of the invention can be calculated in the following manner. First of all, two transparent film samples (30 mm×120 mm) are prepared and humidified at 25° C. and 60% RH for 24 hours; and holes of 6 mmφ are bored at intervals of 100 mm in both terminals thereof by a pin gauge (EP-PH, manufactured by Mitutoyo Corporation), thereby defining an original dimension with punch intervals (L0). One of the samples is treated at 60° C. and 90% RH for 24 hours by a temperature and humidity chamber, PR-45, manufactured by ESPEC Corp., followed by measuring a dimension with punch intervals (L1); and the other sample is treated at 90° C. under a dry condition for 24 hours by a constant temperature oven, DN64, manufactured by Yamato Scientific Co., Ltd., followed by measuring a dimension with punch intervals (L2). In the invention, the coefficient of dimensional change is defined as a value measured to a degree of a minimum scale of 1/1000 mm in the measurement of all intervals. The coefficient of dimensional change under each condition can be determined according to the following expressions.

Coefficient of dimensional change at 60° C. and 90% RH={(L0–L1)/L0}×100

Coefficient of dimensional change at 90° C. under a dry condition={(L0–L2)/L0}×100

It is preferable that the transparent film of the invention has (i) a coefficient of dimensional change after 24 hours at 60° C. and 90% RH and (ii) a coefficient of dimensional change after 24 hours at 90° C. under a drying condition each falling within ±0.5% in any of a machine direction and a direction vertical to a machine direction. In all of these cases, it is preferable that a ratio of (coefficient of dimensional change in a machine direction)/(coefficient of dimensional change in a direction vertical to a machine direction) is from 0.3 to 2.5.

It is more preferable that the coefficient of dimensional change after 24 hours at 60° C. and 90% RH and the coefficient of dimensional change after 24 hours at 90° C. under a drying condition each falls within ±0.4% in any of a machine direction and a direction vertical to a machine direction; and that in all of these cases, the ratio of (coefficient of dimensional change in a machine direction)/(coefficient of dimensional change in a direction vertical to a machine direction) is from 0.4 to 2.2.

A photoelastic modulus of the film of the invention is preferably not more than $25\times10^{-13}$ cm²/dyne, more preferably not more than $10\times10^{-13}$ cm²/dyne, and further preferably not more than $5\times10^{-13}$ cm²/dyne.

With respect to the concrete measurement method, a film sample (10 mm×100 mm) was applied with a tensile stress in a long-axis direction thereof; its retardation was measured by an ellipsometer (M150, manufactured by JASCO Corporation); and a photoelastic modulus was calculated from the amount of change in retardation relative to the stress according to the following expression.

Photoelastic modulus=(Amount of change in retardation)/(Amount of change in stress)

Examples of the cellulose of the cellulose acylate raw material which is used in the invention include cotton linter and wood pulps (for example, broad-leafed pulps and coniferous pulps), and a cellulose acylate obtained from any of these raw material celluloses can be used. A mixture thereof may be used as the case may be. These raw material celluloses are described in detail in, for example, *Course of Plastic Materials* (17): *Cellulose Resins*, written by Marusawa and Uda and published by The Nikkan Kogyo Shimbun, Ltd. (1970) and *Journal of Technical Disclosure*, No. 200-1745 (pages 7 to 8). These materials can be used, but the invention is not particularly limited thereto with respect to the cellulose acylate film of the invention.

(Cellulose Ester)

First of all, the cellulose ester which is preferably used in the invention is described in detail. A glucose unit forming a β-1,4 bonding, which constitutes cellulose, has free hydroxyl groups at the 2-position, 3-position and 6-position. The cellulose ester is a polymer obtained by esterifying a part or the whole of these hydroxyl groups with an acyl group having 2 or more carbon atoms. A degree of substitution of acyl means a proportion in which the hydroxyl groups of cellulose are esterified at each of the 2-position, 3-position and 6-position (the esterification of 100% means a degree of substitution of 1).

A total degree of substitution of acyl, namely (DS2+DS3+DS6) is preferably from 2.00 to 2.90, more preferably from 2.22 to 2.90, and especially preferably from 2.40 to 2.82. Also, {DS6/(DS2+DS3+DS6)} is preferably 0.32 or more, more preferably 0.322 or more, and especially preferably from 0.324 to 0.340. Here, DS2 represents a degree of substitution of a hydroxyl group at the 2-position of the glucose unit with an acyl group (hereinafter also referred to as "degree of substitution of acyl at the 2-position"); DS3 represents a degree of substitution of a hydroxyl group at the 3-position of the glucose unit with an acyl group (hereinafter also referred to as "degree of substitution of acyl at the 3-position"); and DS6 represents a degree of substitution of a hydroxyl group at the 6-position of the glucose unit with an acyl group (hereinafter also referred to as "degree of substitution of acyl at the 6-position). Also, {DS6/(DS2+DS3+DS6)} represents a proportion of the degree of substitution of acyl at the 6-position relative to the total degree of substitution of acyl and is also referred to as "acyl substitution ratio at the 6-position").

The acyl group which is used in the cellulose ester of the invention may be only a single kind, or two or more kinds of acyl groups may be used. It is preferable that the cellulose ester film of the invention has an acyl group having from 2 to 4 carbon atoms as the substituent. When two or more kinds of acyl groups are used, one of these acyl groups is preferably an acetyl group; and the acyl group having from 2 to 4 carbon atoms is preferably a propionyl group or a butyryl group. When the total sum of degrees of substitution of the hydroxyl groups at the 2-position, 3-position and 6-position with an acetyl group is defined as DSA and the total sum of degrees of substitution of the hydroxyl groups at the 2-position, 3-position and 6-position with a propionyl group or a butyryl group is defined as DSB, it is preferable that a value of (DSA+DSB) is from 2.0 to 2.9. It is more preferable that not only the value of (DSA+DSB) is from 2.0 to 2.9, but a value of DSB is from 0.4 to 1.0; and it is further preferable that not only the value of (DSA+DSB) is from 2.40 to 2.82, but the value of DSB is from 0.6 to 0.9. By making the DSA and DSB values fall within the foregoing ranges, a film which is small in changes in each of the Re value and Rth value to be caused due to the circumferential humidity can be obtained, and therefore, such is preferable.

Furthermore, though 28% or more of DSB relies on the substituent of the 6-position hydroxyl group, it is preferable that 30% or more of DSB relies on the substituent of the 6-position hydroxyl group; it is more preferable that 31% or more of DSB relies on the substituent of the 6-position hydroxyl group; and it is especially preferable that 32% or more of DSB relies on the substituent of the 6-position hydroxyl group. Moreover, a cellulose ester film in which the value of (DSA+DSB) at the 6-position of the cellulose acylate is preferably 0.75 or more, more preferably 0.80 or more, and especially preferably 0.85 or more can be exemplified. By such a cellulose ester film, a solution having preferred solubility can be prepared. In particular, a good solution can be prepared in a non-chlorine based organic solvent. In addition, a solution with low viscosity and good filtration properties can be prepared.

The acyl group having 2 or more carbon atoms of the cellulose ester of the invention may be an aliphatic group or an aryl group and is not particularly limited. Examples of the cellulose ester include alkylcarbonyl esters, alkenylcarbonyl esters, aromatic carbonyl esters and aromatic alkylcarbonyl esters of cellulose, and these cellulose esters may have a further substituted group. Preferred examples thereof include a propionyl group, a butanoyl group, a heptanoyl group, a hexanoyl group, an octanoyl group, a decanoyl group, a dodecanoyl group, a tridecanoyl group, a detradecanoyl group, a hexadecanoyl group, an octadecanoyl group, an isobutanoyl group, a t-butanoyl group, a cyclohexanecarbonyl group, an oleoyl group, a benzoyl group, a naphthylcarbonyl group and a cinnamoyl group. Of these, propionyl, butanoyl, dodecanoyl, octadecanoyl, t-butanoyl, oleoyl, benzoyl, naphthylcarbonyl, cinnamoyl and the like are more preferable, with propionyl and butanoyl being especially preferable.

In the acylation of cellulose, when an acid anhydride or an acid chloride is used as an acylating agent, an organic acid, for example, acetic acid and methylene chloride is used as an organic solvent which is the reaction solvent.

With respect to a catalyst, when the acylating agent is an acid anhydride, a protonic catalyst such as sulfuric acid is preferably used; and when the acylating agent is an acid chloride (for example, $CH_3CH_2COCl$), a basic compound is used.

The most general industrial synthesis method of a mixed fatty acid ester of cellulose is a method for acylating cellulose with a mixed organic acid component containing a fatty acid corresponding to an acetyl group and other acyl group (for example, acetic acid, propionic acid and valeric acid) or an acid anhydride thereof.

The cellulose ester which is used in the invention can be synthesized by a method described in JP-A-10-45804.

In the cellulose ester film of the invention, additives such as a plasticizer (for example, phthalic esters and phosphoric esters), an ultraviolet ray absorber, an antioxidant and a matting agent can also be added.

(Plasticizer)

It is preferable that a plasticizer is contained in the film of the invention. The plasticizer which can be used is not particularly limited. It is preferable that compounds which are more hydrophobic than the cellulose acylate are used singly or in combination. Examples of phosphoric ester based compounds include triphenyl phosphate, tricresyl phosphate, cresyl diphenyl phosphate, octyl diphenyl phosphate, diphenyl biphenyl phosphate, trioctyl phosphate and tributyl phosphate; examples of phthalic ester based compounds include diethyl phthalate, dimethoxyethyl phthalate, dimethyl phthalate, dioctyl phthalate, dibutyl phthalate and di-2-ethylhexyl phthalate; and examples of glycolic ester based compounds include triacetin, tributyrin, butylphthalylbutyl glycolate, ethylphthalylethyl glycolate, methylphthalylethyl glycolate and butylphthalylbutyl glycolate. The plasticizer may be used in combination of two or more kinds thereof as the need arises.

(Aliphatic Polyhydric Alcohol Ester)

In view of the matter that a film with high optical characteristic and stability in dimension or the like is obtainable, it is preferable that an aliphatic polyhydric alcohol ester made of an aliphatic polyhydric alcohol and one or more kinds of monocarboxylic acids is contained as the plasticizer in the cellulose ester film of the invention.

The aliphatic polyhydric alcohol ester is hereunder described in detail.

The aliphatic polyhydric alcohol ester according to the invention is made of an ester of a divalent or polyvalent aliphatic polyhydric alcohol and one or more kinds of monocarboxylic acids.

(Aliphatic Polyhydric Alcohol)

The aliphatic polyhydric alcohol according to the invention is a divalent or polyvalent alcohol and is preferably one represented by the following formula (3).

    Formula (3)

In the formula (3), R1 is an n-valent aliphatic organic group; n represents a positive integer of 2 or more; the OH group represents an alcoholic or phenolic hydroxyl group; and m is preferably from 2 to 20.

In the formula (3), with respect to the n-valent aliphatic organic group, examples of divalent groups include an alkylene group (for example, a methylene group, an ethylene group, a trimethylene group, a tetramethylene group, a propylene group, an ethylethylene group, a pentamethylene group and a hexamethylene group); an alkenylene group (for example, a vinylene group, a propenylene group and an ethenylene group); an alkynylene group (for example, an ethynylene group and a 3-pentynylene group); and a cycloalkylene group (for example, a 1,4-cyclohexanediyl group).

In the formula (3), with respect to the n-valent aliphatic organic group, examples of trivalent groups include an ethanetriyl group, a propanetriyl group, a butanetriyl group, a pentanetriyl group, a hexanetriyl group, a pentanetriyl group, an octanetriyl group, a nonanetriyl group, a decanetriyl group, an undecanetriyl group, a dodecanetriyl group, a cyclohexanetriyl group, a cyclopentanetriyl group, a benzenetriyl group, a naphthalenetriyl group and a 1,2,3-propanetriyl group.

In the formula (3), with respect to the n-valent aliphatic organic group, examples of tetravalent groups include a propanediylidene group, a 1,3-propanediyl-2-yl-idene group, a butanediylidene group, a pentanediylidene group, a hexanediylidene group, a heptanediylidene group, an octanediylidene group, a nonanediylidene group, a decanediylidene group, an undecanediylidene group, a dodecanediylidene group, a cyclohexanediylidene group, a cyclopentanediylidene group, a benzenetetrayl group and a naphthalenetetrayl group.

The foregoing n-valent aliphatic organic group may further have a substituent. Examples of the substituent include an alkyl group (for example, a methyl group, an ethyl group, a butyl group, a pentyl group, a 2-methoxyethyl group, a trifluoromethyl group and a 2-ethylhexyl group); an aryl group (for example, a phenyl group and a naphthyl group); an alkoxyl group (for example, a methoxy group, an ethoxy group and a butoxy group); an alkoxycarbonyl group (for example, a methoxycarbonyl group and an i-propoxycarbonyl group); an acyloxy group (for example, an acetyloxy group and an ethylcarbonyloxy group); a carbamoyl group (for example, a methylcarbamoyl group, an ethylcarbamoyl group, a butylcarbamoyl group and a phenylcarbamoyl group); a sulfamoyl group (for example, a sulfamoyl group, a methylsulfamoyl group, a dimethylsulfamoyl group and a phenylsulfamoyl group); an alkylthio group (for example, a methylthio group, an ethylthio group and an octylthio group); an arylthio group (for example, a phenylthio group and a p-tolylthio group); an amino group (for example, an amino group, a methylamino group, a diethylamino group and a methoxyethylamino group); an acylamino group (for example, an acetylamino group, a chloroacetylamino group, a propionylamino group, a benzoylamino group and a trifluoroacetylamino group); an alkylureido group (for example, a methylureido group, an ethylureido group, a methoxyethylureido group and a dimethylureido group); an arylureido group (for example, a phenylureido group); an alkylsulfonamide group (for example, a methanesulfonamide group, an ethanesulfonamide group, a butanesulfonamide group, a trifluoromethylsulfonamide group and a 2,2,2-trifluoroethylsulfonamide group); an arylsulfonamide group (for example, a phenylsulfonamide group and a tolylsulfonamide group); an alkylaminosulfonylamino group (for example, a methylaminosulfonylamino group and an ethylaminosulfonylamino group); an arylaminosulfonylamino group (for example, a phenylaminosulfonylamino group); a hydroxyl group; a cyano group; a nitro group; and a heterocyclic group (for example, a pyridyl group, a pyrimidyl group, a pyrazyl group, a pyrrolyl group, an indolyl group, a pyrazolyl group, an imidazolyl group, a furyl group, an oxazolyl group, a thiazolyl group, a quinolyl group and a thienyl group).

Examples of preferred aliphatic polyhydric alcohols include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Of these, triethylene glycol, tetraethylene glycol, dipropylene glycol, tripropylene glycol, sorbitol, trimethylolpropane and xylitol are especially preferably used.

(Monocarboxylic Acid)

The monocarboxylic acid which is used for forming the aliphatic polyhydric alcohol ester according to the invention is not particularly limited, and known aliphatic monocarboxylic acids, alicyclic monocarboxylic acids, aromatic monocarboxylic acids and the like can be used. From the viewpoints of enhancing the moisture permeability and retention of the cellulose ester film, it is preferred to use an alicyclic monocarboxylic acid or an aromatic monocarboxylic acid.

As the aliphatic monocarboxylic acid, fatty acids having from 1 to 32 carbon atoms, which have a straight chain or a side chain, can be preferably used. The carbon atom number is more preferably from 1 to 20, and especially preferably from 1 to 10. What acetic acid is contained is preferable because the affinity with the cellulose ester increases. It is also preferred to use a mixture of acetic acid with other monocarboxylic acid.

Examples of preferred monocarboxylic acids include those described below, but it should not be construed that the invention is limited thereto.

Examples of the preferred monocarboxylic acid include saturated fatty acids (for example, acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachidic acid, behenic acid, lignoceric acid, cerotic acid, heptacosanoic acid, montanic acid, melissic acid and lacceric acid); and unsaturated fatty acids (for example, undecylenic acid, oleic acid, sorbic acid, linoleic acid, linolenic acid and arachidonic acid). These may further have a substituent.

Examples of preferred alicyclic monocarboxylic acids include cyclopentanecarboxylic acid, cyclohexanecarboxylic acid, cyclooctanecarboxylic acid and derivatives thereof.

Examples of preferred aromatic monocarboxylic acids include aromatic monocarboxylic acids in which an alkyl group is introduced into a benzene ring of a benzoic acid (for example, benzoic acid and toluic acid); aromatic monocarboxylic acids having two or more benzene rings (for example, biphenylcarboxylic acid, naphthalenecarboxylic acid and tetralincarboxylic acid); and derivatives thereof. Of these, benzoic acid is especially preferable. Besides, the aromatic ring of the aromatic monocarboxylic acid may have a substituent.

(Molecular Weight of Aliphatic Polyhydric Alcohol Ester)

The molecular weight of the polyhydric alcohol ester according to the invention is not particularly limited and is preferably from 300 to 1,500, and more preferably from 350 to 750. From the standpoint of retention, it is preferable that the molecular weight is high, whereas from the standpoints of moisture permeability and affinity with the cellulose ester, it is preferable that the molecular weight is low.

Here, the molecular weight of the foregoing aliphatic polyhydric alcohol ester can be measured by using a commercially available GPC (gel permeation chromatography) analyzer.

The carboxylic acid in the aliphatic polyhydric alcohol ester according to the invention may be a single kind or in admixture of two or more kinds thereof. Also, all of the OH groups in the aliphatic polyhydric alcohol may be esterified, or a part of the OH groups may be retained as they are. It is preferable that the aliphatic polyhydric alcohol ester has three or more aromatic rings or cycloalkyl rings in a molecule thereof.

Examples of the aromatic ring which is used in the invention include an aromatic carbon ring (for example, a benzene ring, a naphthalene ring, a biphenyl ring, a p-terphenyl ring, a diphenylmethane ring, a triphenylmethane ring, a bibenzyl ring, a stilbene ring, an indene ring, a tetralin ring, an anthracene ring and a phenanthrene ring); and an aromatic heterocycle (for example, a furan ring, a pyrrole ring, a pyrazole ring, an imidazole ring, an oxazole ring, a thiazole ring, a 1,2,3-oxadiazole ring, a 1,2,3-triazole ring, a 1,2,4-triazole ring, a 1,3,4-thiadiazole ring, a pyridine ring, a pyridazine ring, a pyrimidine ring, a pyrazine ring, an s-triazine ring, a benzofuran ring, an indole ring, a benzothiophene ring, a benzimidazole ring, a benzothiazole ring, purine ring, a quinoline ring and an isoquinoline ring).

Examples of the cycloalkyl ring which is used in the invention include a cyclopentane ring, a cyclohexane ring and a cyclooctane ring.

Specific examples of the aliphatic polyhydric alcohol ester according to the invention will be given below, but it should not be construed that the invention is limited thereto.

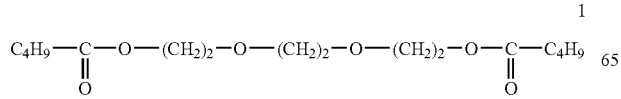

-continued

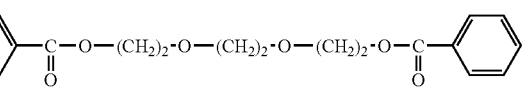

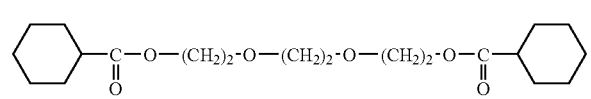

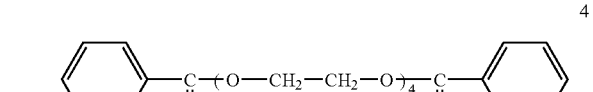

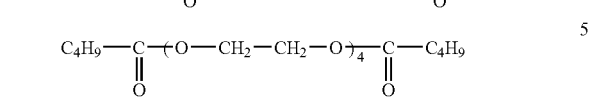

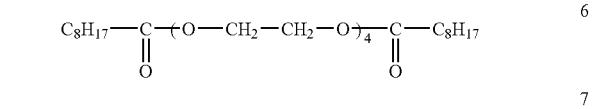

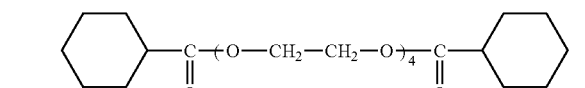

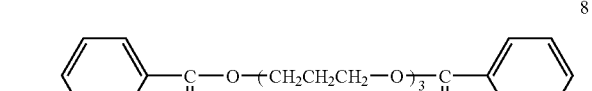

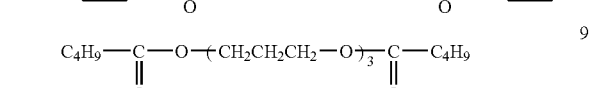

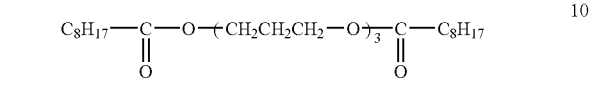

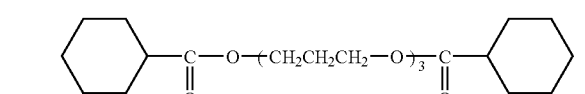

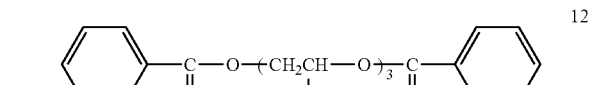

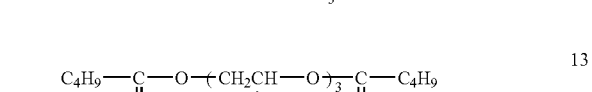

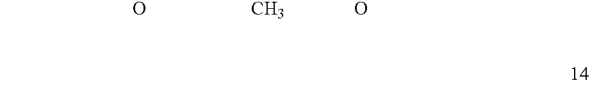

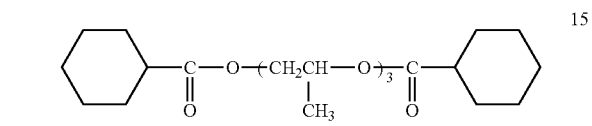

16
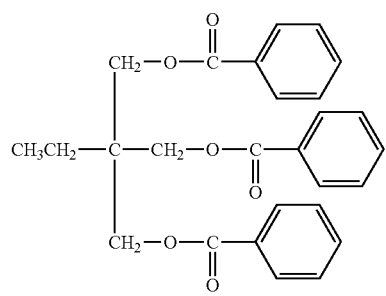
17
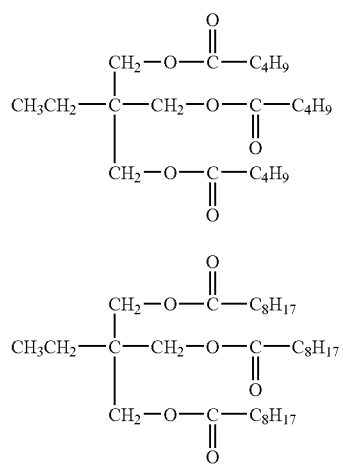
18
19
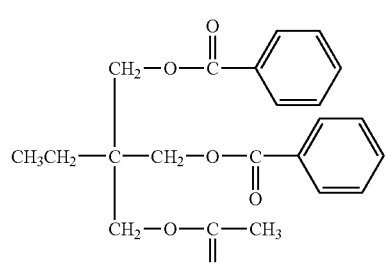
20
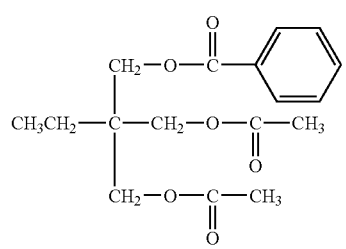
21
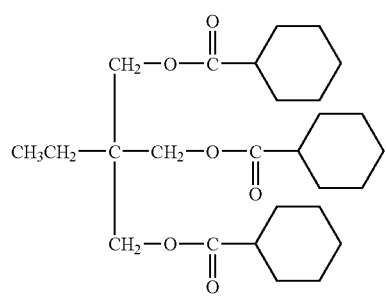
22
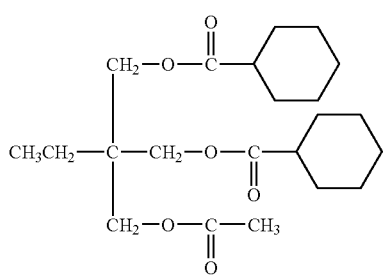
23
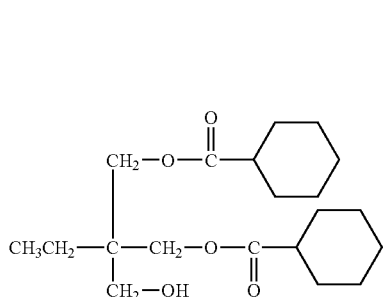
24
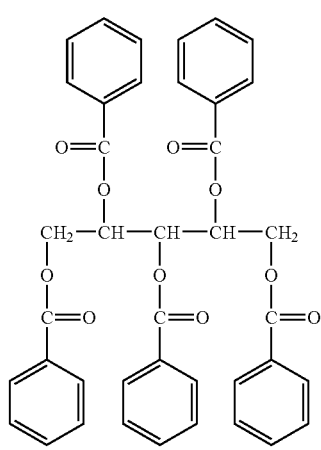
25
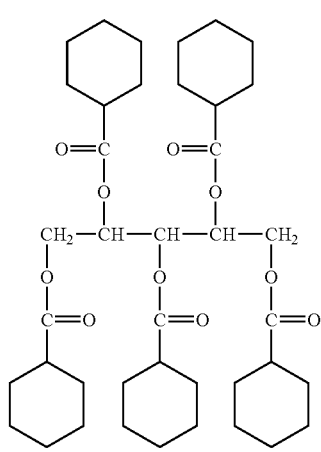

26

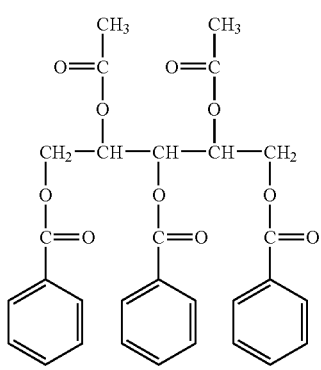

27

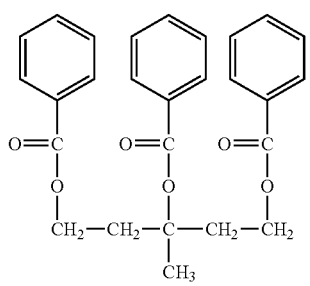

28

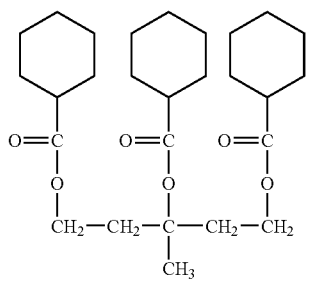

29

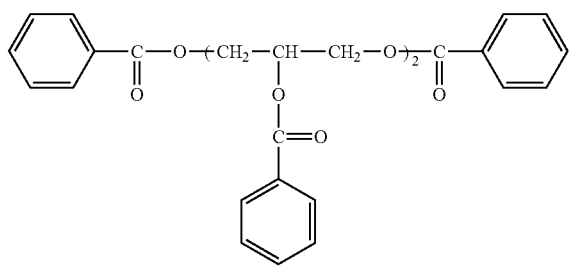

30

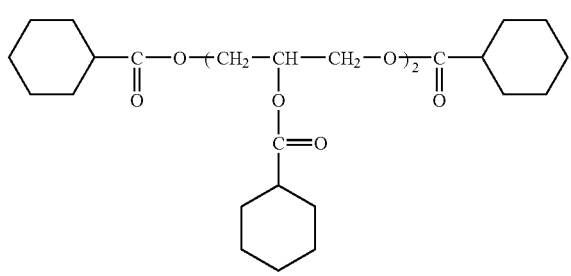

31

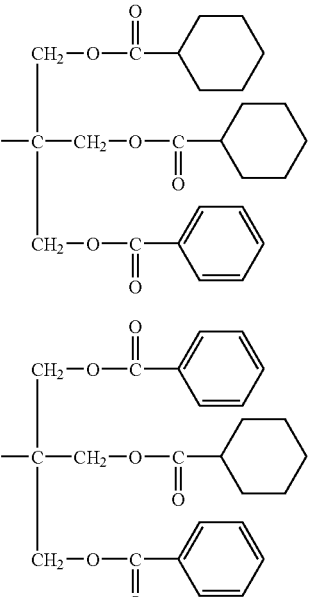

33

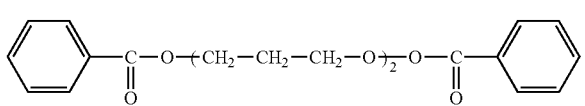

34

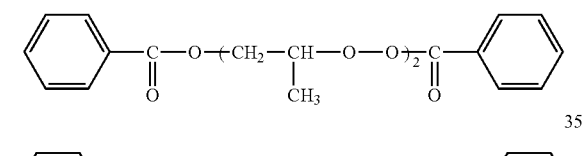

35

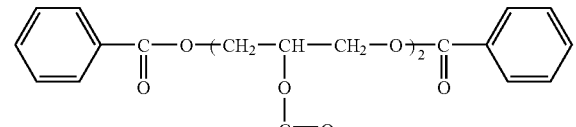

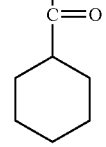

The use amount (which may also be "content") of the aliphatic polyhydric alcohol ester according to the invention is preferably in the range of from 3% by mass to 30% by mass, more preferably in the range of from 5% by mass to 25% by mass, and especially preferably in the range of from 5% by mass to 20% by mass relative to the cellulose ester film.

In the invention, it is preferable that an ultraviolet ray absorber is contained in the cellulose ester film. As the ultraviolet ray absorber, ones having excellent absorbing ability of ultraviolet rays having a wavelength of not more than 370 nm from the standpoint of preventing the deterioration of a liquid crystal and having low absorption of visible light having a wavelength of 400 nm or more as far as possible from the standpoint of revealing good liquid crystal display properties are preferably used. In particular, the transmittance at a wavelength of 370 nm is desirably not more than 10% by mass, preferably not more than 5% by mass, and more preferably not more than 2% by mass. Examples of the ultraviolet ray absorber which is used include hydroxybenzophenone based compounds, benzotriazole based compounds, salicylic ester based compounds, triazine based compounds, benzophenone based compounds, cyanoacrylate based compounds and nickel complex salt based compounds. However, it should not be construed that the invention is limited thereto. The ultraviolet ray absorber may be used in combination of two or more kinds thereof. With respect to a method for adding the ultraviolet ray absorber to a dope (the cellulose ester solution to be used for solution casting may also be referred to as "dope" in the invention), the ultraviolet ray absorber may be added after dissolving in an organic solvent such as alcohols, methylene chloride and dioxolane, or the ultraviolet ray absorber may be added directly in the dope composition. An ultraviolet ray absorber which is insoluble in an organic solvent, such as inorganic powders, is dispersed together with an organic solvent in the cellulose ester by using a dissolver or a sand mill and then added in the dope. In the invention, the use amount of the ultraviolet ray absorber is from 0.1 to 5.0% by mass, preferably from 0.5 to 2.0% by mass, and more preferably from 0.8 to 2.0% by mass relative to the cellulose ester.

(Retardation Developing Agent)

In the invention, for the purpose of developing the retardation value, it is preferred to use a retardation developing agent. Examples of the retardation developing agent which can be used in the invention include those composed of a rod-like or disc-like compound. As the foregoing rod-like or disc-like compound, compounds having at least two aromatic rings can be preferably used as the retardation developing agent. The addition amount of the retardation developing agent composed of a rod-like compound is preferably from 0.1 to 30 parts by mass, and more preferably from 0.5 to 20 parts by mass based on 100 parts by mass of the polymer component containing a cellulose acylate.

The disc-like retardation developing agent is used in an amount preferably in the range of from 0.05 to 20 parts by mass, more preferably in the range of 1.0 to 15 parts by mass, and further preferably in the range of from 3.0 to 10 parts by mass based on 100 parts by mass of the polymer component containing a cellulose acylate.

When especially large Rth retardation is required, the disc-like compound is preferably used because it is more excellent in Rth retardation developing properties than the rod-like compound. The retardation developing agent may be used in combination of two or more kinds thereof.

It is preferable that the retardation developing agent has maximum absorption in a wavelength region of from 250 to 400 nm; and it is preferable that the retardation developing agent does not substantially have absorption in a visible region.

The disc-like compound is hereunder described. As the disc-like compound, a compound having at least two aromatic rings can be used.

In this specification, the "aromatic ring" includes, in addition to an aromatic hydrocarbon ring, an aromatic heterocycle.

The aromatic hydrocarbon ring is especially preferably a 6-membered ring (namely, a benzene ring).

The aromatic heterocycle is generally an unsaturated heterocycle. The aromatic heterocycle is preferably a 5-membered ring, a 6-membered ring or a 7-membered ring, and more preferably a 5-membered ring or a 6-membered ring. The aromatic heterocycle generally has the most double bonds. The hetero atom is preferably a nitrogen atom, an oxygen atom or a sulfur atom, and especially preferably a nitrogen atom. Examples of the aromatic heterocycle include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, pyridazine ring, a pyrimidine ring, a pyrazine ring and a 1,3,5-triazine ring.

As the aromatic ring, a benzene ring, a fused benzene ring and a biphenyl are preferable. A 1,3,5-triazine ring is especially preferably used. Concretely, compounds disclosed in, for example, JP-A-2001-166144 are preferably used.

The carbon atom number of the aromatic ring which the retardation developing agent has is preferably from 2 to 20, more preferably from 2 to 12, further preferably from 2 to 8, and most preferably from 2 to 6.

The bonding relationship between the two aromatic rings can be classified into (a) the case where the two aromatic rings form a fused ring; (b) the case where the two aromatic rings are directly bonded to each other via a single bond; and (c) the case where the two aromatic rings are bonded to each other via a connecting group (because of the aromatic rings, a spiro bond cannot be formed). The bonding relationship may be any of the foregoing (a) to (c).

Examples of the fused ring (a) (a fused ring of two or more aromatic rings) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxanthiine ring, a phenoxazine ring and a thianthrene ring. Of these, a naphthalene ring, an azulene ring, an indole ring, a benzoxazole ring, a benzothiazole ring, a benzimidazole ring, a benzotriazole ring and a quinoline ring are preferable.

The single bond (b) is preferably a bond between carbon atoms of the two aromatic rings. The two aromatic rings may be taken together via two or more single bonds, thereby forming an aliphatic ring or a non-aromatic heterocycle between the two aromatic rings.

It is preferable that the connecting group (c) bonds to the carbon atoms of the two aromatic rings. The connecting group is preferably an alkylene group, an alkenylene group, an alkynylene group, —CO—, —O—, —NH—, —S— or a combination thereof. Examples of the connecting group which is composed of a combination will be given below. The left and right relationship in the following examples of the connecting group may be reversed.

c1: —CO—O—
c2: —CO—NH—
c3: -alkylene-O—
c4: —NH—CO—NH—
c5: —NH—CO—O—
c6: —O—CO—C—
c7: —O-alkylene-O—
c8: —CO-alkenylene-
c9: —CO-alkynylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the connecting group may each have a substituent.

Examples of the substituent include a halogen atom (for example, F, Cl, Br and I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group and a non-aromatic heterocyclic group.

The carbon atom number of the alkyl group is preferably from 1 to 8. A chain alkyl group is more preferable than a cyclic alkyl group, and a straight chain alkyl group is especially preferable. The alkyl group may further have a substituent (for example, a hydroxyl group, a carboxyl group, an alkoxy group and an alkyl-substituted amino group). Examples of the alkyl group (including the substituted alkyl group) include a methyl group, an ethyl group, an n-butyl group, an n-hexyl group, a 2-hydroxyethyl group, a 4-carboxybutyl group, a 2-methoxyethyl group and a 2-diethylaminoethyl group.

The carbon atom number of the alkenyl group is preferably from 2 to 8. A chain alkenyl group is more preferable than a cyclic alkenyl group, and a straight chain alkenyl group is especially preferable. The alkenyl group may further have a substituent. Examples of the alkenyl group include a vinyl group, an allyl group and a 1-hexenyl group.

The carbon atom number of the alkynyl group is preferably from 2 to 8. A chain alkynyl group is more preferable than a cyclic alkynyl group, and a straight chain alkynyl group is especially preferable. The alkynyl group may further have a substituent. Examples of the alkynyl group include an ethynyl group, a 1-butynyl group and a 1-hexynyl group.

The carbon atom number of the aliphatic acyl group is preferably from 1 to 10. Examples of the aliphatic acyl group include an acetyl group, a propanoyl group and a butanoyl group.

The carbon atom number of the aliphatic acyloxy group is preferably from 1 to 10. Examples of the aliphatic acyloxy group include an acetoxy group.

The carbon atom number of the alkoxy group is preferably from 1 to 8. The alkoxy group may further have a substituent (for example, an acetoxy group). Examples of the alkoxy group (including the substituted alkoxy group) include a methoxy group, an ethoxy group, a butoxy group and a methoxyethoxy group.

The carbon atom number of the alkoxycarbonyl group is preferably from 2 to 10. Examples of the alkoxycarbonyl group include a methoxycarbonyl group and an ethoxycarbonyl group.

The carbon atom number of the alkoxycarbonylamino group is preferably from 2 to 10. Examples of the alkoxycarbonyl-amino group include a methoxycarbonylamino group and an ethoxycarbonylamino group.

The carbon atom number of the alkylthio group is preferably from 1 to 12. Examples of the alkylthio group include a methylthio group, an ethylthio group and an octylthio group.

The carbon atom number of the alkylsulfonyl group is preferably from 1 to 8. Examples of the alkylsulfonyl group include a methanesulfonyl group and an ethanesulfonyl group.

The carbon atom number of the aliphatic amide group is preferably from 1 to 10. Examples of the aliphatic amide group include an acetamide group.

The carbon atom number of the aliphatic sulfonamide group is preferably from 1 to 8. Examples of the aliphatic sulfonamide group include a methanesulfonamide group, a butanesulfonamide group and an n-octanesulfonamide group.

The carbon atom number of the aliphatic substituted amino group is preferably from 1 to 10. Examples of the aliphatic substituted amino group include a dimethylamino group, a diethylamino group and a 2-carboxyethylamino group.

The carbon atom number of the aliphatic substituted carbamoyl group is preferably from 2 to 10. Examples of the aliphatic substituted carbamoyl group include a methyl-carbamoyl group and a diethylcarbamoyl group.

The carbon atom number of the aliphatic substituted sulfamoyl group is preferably from 1 to 8. Examples of the aliphatic substituted sulfamoyl group include a methyl-sulfamoyl group and a diethylsulfamoyl group.

The carbon atom number of the aliphatic substituted ureido group is preferably from 2 to 10. Examples of the aliphatic substituted ureido group include a methylureido group.

Examples of the non-aromatic heterocyclic group include a piperidino group and a morpholino group.

It is preferable that the retardation developing agent has a molecular weight of from 300 to 800.

It is preferred to use a triazine compound represented by the following formula (I) as the disc-like compound.

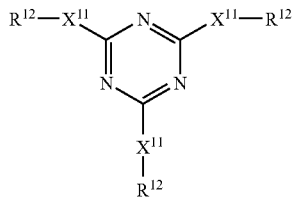

Formula (I)

In the foregoing formula (I), $R^{12}$s each independently represents an aromatic ring or a heterocycle having a substituent at least at any one of the ortho-position, meta-position and para-position; and $X^{11}$s each independently represents a single bond or $-NR^{13}-$, wherein $R^{13}$s each independently represents a hydrogen atom, a substituted or unsubstituted alkyl group, a substituted or unsubstituted alkenyl group, a substituted or unsubstituted aryl group or a substituted or unsubstituted heterocyclic group.

The aromatic ring represented by $R^{12}$ is preferably phenyl or naphthyl, and especially preferably phenyl. The aromatic ring represented by $R^{12}$ may have at least one substituent at any one of substitution positions thereof. Examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamide group, a carbamoyl group, an alkyl-substituted carbamoyl group, an alkenyl-substituted carbamoyl group, an aryl-substituted carbamoyl group, an amide group, an alkylthio group, an alkenylthio group, an arylthio group and an acyl group.

It is preferable that the heterocyclic group represented by $R^{12}$ has aromatic properties. The heterocycle having aromatic properties is generally an unsaturated heterocycle, and preferably a heterocycle having the most double bonds. The heterocycle is preferably a 5-membered ring, a 6-membered ring or a 7-membered ring, more preferably a 5-membered ring or a 6-membered ring, and most preferably a 6-membered ring. The hetero atom of the heterocycle is preferably a nitrogen atom, a sulfur atom or an oxygen atom, and especially preferably a nitrogen atom. The heterocycle having aromatic properties is especially preferably a pyridine ring (2-pyridyl or 4-pyridyl as the heterocyclic ring). The heterocyclic group may have a substituent. Examples of the substituent of the heterocyclic ring are the same as those in the substituent of the foregoing aryl moiety.

When $X^{11}$ represents a single bond, the heterocyclic ring is preferably a heterocyclic ring having a free valence on a nitrogen atom. The heterocyclic group having a free valence on a nitrogen atom is preferably a 5-membered ring, a 6-membered ring or a 7-membered ring, more preferably a 5-membered ring or a 6-membered ring, and most preferably a 6-membered ring. The heterocyclic group may have plural nitrogen atoms. Also, the heterocyclic group may have a hetero atom other than the nitrogen atom (for example, O and S). Examples of the heterocyclic group having a free valence on a nitrogen atom will be given below.

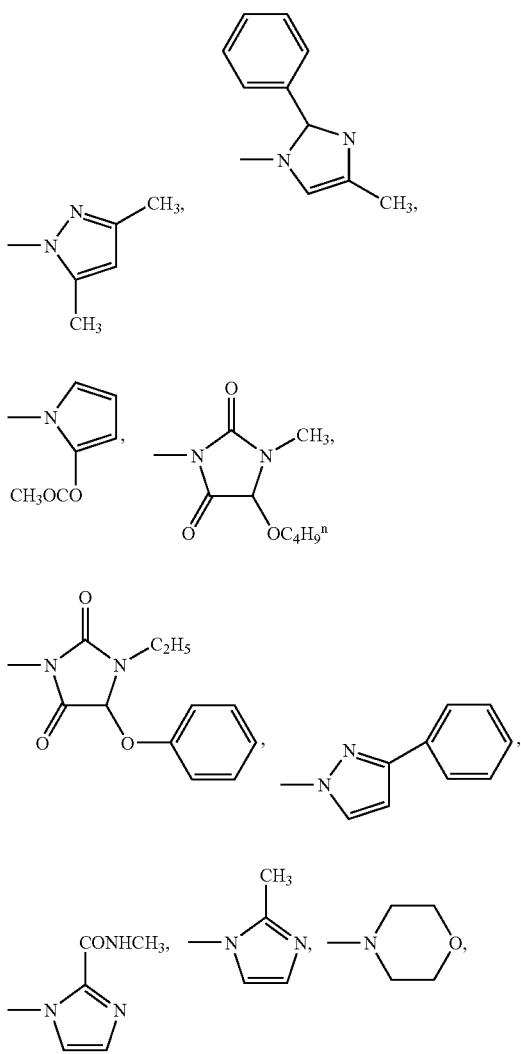

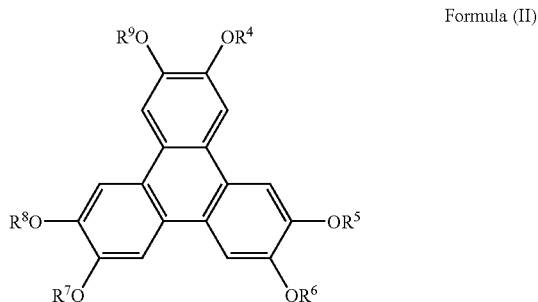

In the formula (I), $X^{11}$s each independently represents a single bond or $-NR^{13}-$ wherein $R^{13}$s each independently represents a hydrogen atom, a substituted or unsubstituted alkyl group, a substituted or unsubstituted alkenyl group, a substituted or unsubstituted aryl group or a substituted or unsubstituted heterocyclic group.

The alkyl group represented by $R^{13}$ may be a cyclic alkyl group or a chain alkyl group and is preferably a chain alkyl group. A straight chain alkyl group is more preferable than a branched, chain alkyl group. The carbon atom number of the alkyl group is preferably from 1 to 30, more preferably from 1 to 20, further preferably from 1 to 10, even more preferably from 1 to 8, and most preferably from 1 to 6. The alkyl group may have a substituent. Examples of the substituent include a halogen atom, an alkoxy group (for example, methoxy and ethoxy) and an acyloxy group (for example, acryloyloxy and methacryloyloxy).

The alkenyl group represented by $R^{13}$ may be a cyclic alkenyl group or a chain alkenyl group and is preferably a chain alkenyl group. A straight chain alkenyl group is more preferable than a branched, chain alkenyl group. The carbon atom number of the alkenyl group is preferably from 2 to 30, more preferably from 2 to 20, further preferably from 2 to 10, even preferably from 2 to 8, and most preferably from 2 to 6. The alkenyl group may have a substituent. Examples of the substituent are the same as those in the substituent of the foregoing alkyl group.

The aromatic ring group and the heterocyclic group represented by $R^{13}$ are the same as those in the aromatic ring and the heterocycle represented by $R^{12}$, and preferred ranges are also the same. Each of the aromatic ring group and the heterocycle may further have a substituent, and examples of the substituent are the same as those in the substituent of each of the aromatic ring group and the heterocycle represented by $R^{12}$.

A triphenylene compound represented by the following formula (II) can also be preferably used as the disc-like compound.

Formula (II)

[Structure of triphenylene with substituents $OR^4$, $OR^5$, $OR^6$, $OR^7$, $OR^8$, $OR^9$]

In the foregoing formula (II), $R^4$, $R^5$, $R^6$, $R^7$, $R^8$ and $R^9$ each independently represents a hydrogen atom or a substituent.

Examples of the substituent represented by each of $R^4$, $R^5$, $R^6$, $R^7$, $R^8$ and $R^9$ include an alkyl group (preferably an alkyl group having from 1 to 40 carbon atoms, more preferably an alkyl group having from 1 to 30 carbon atoms, and especially preferably an alkyl group having from 1 to 20 carbon atoms, for example, a methyl group, an ethyl group, an isopropyl group, a tert-butyl group, an n-octyl group, an n-decyl group, an n-hexadecyl group, a cyclopropyl group, a cyclopentyl group and a cyclohexyl group); an alkenyl group (preferably an alkenyl group having from 2 to 40 carbon atoms, more preferably an alkenyl group having from 2 to 30 carbon atoms, and especially preferably an alkenyl group having from 2 to 20 carbon atoms, for example, a vinyl group, an allyl group, a 2-butenyl group and a 3-pentenyl group); an alkynyl group (preferably an alkynyl group having from 2 to 40 carbon atoms, more preferably an alkynyl group having from 2 to 30 carbon atoms, and especially preferably an alkynyl group having from 2 to 20 carbon atoms, for example, a propargyl group and a 3-pentynyl group); an aryl group (preferably an aryl group having from 6 to 30 carbon atoms, more preferably an aryl group having from 6 to 20 carbon atoms, and especially preferably an aryl group having from 6 to 12 carbon atoms, for example, a phenyl group, a p-methylphenyl group and a naphthyl group); a substituted or unsubstituted amino group (preferably an amino group having from 0 to 40 carbon atoms, more preferably an amino group having from 0 to 30 carbon atoms, and especially preferably an amino group having from 0 to 20 carbon atoms, for example, an unsubstituted amino group, a methylamino group, a dimethylamino group, a diethylamino group and an anilino group);

an alkoxy group (preferably an alkoxy group having from 1 to 40 carbon atoms, more preferably an alkoxy group having from 1 to 30 carbon atoms, and especially preferably an alkoxy group having from 1 to 20 carbon atoms, for example, a methoxy group, an ethoxy group and a butoxy group); an aryloxy group (preferably an aryloxy group having from 6 to 40 carbon atoms, more preferably an aryloxy group having from 6 to 30 carbon atoms, and especially preferably an aryloxy group having from 6 to 20 carbon atoms, for example, a phenyloxy group and a 2-naphthyloxy group); an acyl group (preferably an acyl group having from 1 to 40 carbon atoms, more preferably an acyl group having from 1 to 30 carbon atoms, and especially preferably an acyl group having from 1 to 20 carbon atoms, for example, an acetyl group, a benzoyl group, a formyl group and a pivaloyl group); an alkoxycarbonyl group (preferably an alkoxycarbonyl group having from 2 to 40 carbon atoms, more preferably an alkoxycarbonyl group having from 2 to 30 carbon atoms, and especially preferably an alkoxycarbonyl group having from 2 to 20 carbon atoms, for example, a methoxycarbonyl group and an ethoxycarbonyl group); an aryloxycarbonyl group (preferably an aryloxycarbonyl group having from 7 to 40 carbon atoms, more preferably an aryloxycarbonyl group having from 7 to 30 carbon atoms, and especially preferably from 7 to 20 carbon atoms, for example, a phenyloxycarbonyl group); an acyloxy group (preferably an acyloxy group having from 2 to 40 carbon atoms, more preferably an acyloxy group having from 2 to 30 carbon atoms, and especially preferably an acyloxy group having from 2 to 20 carbon atoms, for example, an acetoxy group and a benzoyloxy group);

an acylamino group (preferably an acylamino group having from 2 to 40 carbon atoms, more preferably an acylamino group having from 2 to 30 carbon atoms, and especially preferably an acylamino group having from 2 to 20 carbon atoms, for example, an acetylamino group and a benzoylamino group); an alkoxycarbonylamino group (preferably an alkoxycarbonylamino group having from 2 to 40 carbon atoms, more preferably an alkoxycarbonylamino group having from 2 to 30 carbon atoms, and especially preferably an alkoxycarbonylamino group having from 2 to 20 carbon atoms, for example, a methoxycarbonylamino group); an aryloxycarbonylamino group (preferably an aryloxycarbonylamino group having from 7 to 40 carbon atoms, more preferably an aryloxycarbonylamino group having from 7 to 30 carbon atoms, and especially preferably an aryloxycarbonylamino group having from 7 to 20 carbon atoms, for example, a phenyloxycarbonylamino group); a sulfonylamino group (preferably a sulfonylamino group having from 1 to 40 carbon atoms, more preferably a sulfonylamino group having from 1 to 30 carbon atoms, and especially preferably a sulfonylamino group having from 1 to 20 carbon atoms, for example, a methanesulfonylamino group and a benzenesulfonyl-amino group); a sulfamoyl group (preferably a sulfamoyl group having from 0 to 40 carbon atoms, more preferably a sulfamoyl group having from 0 to 30 carbon atoms, and especially preferably a sulfamoyl group having from 0 to 20 carbon atoms, for example, a sulfamoyl group, a methylsulfamoyl group, a dimethylsulfamoyl group and a phenylsulfamoyl group); a carbamoyl group (preferably a carbamoyl group having from 1 to 40 carbon atoms, more preferably a carbamoyl group having from 1 to 30 carbon atoms, and especially preferably a carbamoyl group having from 1 to 20 carbon atoms, for example, an unsubstituted carbamoyl group, a methylcarbamoyl group, a diethylcarbamoyl group and a phenylcarbamoyl group);

an alkylthio group (preferably an alkylthio group having from 1 to 40 carbon atoms, more preferably an alkylthio group having from 1 to 30 carbon atoms, and especially preferably from 1 to 20 carbon atoms, for example, a methylthio group, an ethylthio group and an octylthio group); an arylthio group (preferably an arylthio group having from 6 to 40 carbon atoms, more preferably an arylthio group having from 6 to 30 carbon atoms, and especially preferably an arylthio group having from 6 to 20 carbon atoms, for example, a phenylthio group); a sulfonyl group (preferably a sulfonyl group having from 1 to 40 carbon atoms, a sulfonyl group having from 1 to 30 carbon atoms, and especially preferably a sulfonyl group having from 1 to 20 carbon atoms, for example, a mesyl group and tosyl group); a sulfinyl group (preferably a sulfinyl group having from 1 to 40 carbon atoms, more preferably a sulfinyl group having from 1 to 30 carbon atoms, and especially preferably a sulfinyl group having from 1 to 20 carbon atoms, for example, a methanesulfinyl group and a benzenesulfinyl group); a ureido group (preferably a ureido group having from 1 to 40 carbon atoms, more preferably a ureido group having from 1 to 30 carbon atoms, and especially preferably a ureido group having from 1 to 20 carbon atoms, for example, an unsubstituted ureido group, a methylureido group and a phenylureido group); a phosphoric acid amide group (preferably a phosphoric acid amide group having from 1 to 40 carbon atoms, more preferably a phosphoric acid amide group having from 1 to 30 carbon atoms, and especially preferably a phosphoric acid amide group having from 1 to 20 carbon atoms, for example, a diethylphosphoric acid amide group and a phenylphosphoric acid amide group); a hydroxyl group; a mercapto group; a halogen atom (for example, a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocyclic group (preferably a heterocyclic group having from 1 to 30 carbon atoms, and more preferably a heterocyclic group having from 1 to 12 carbon atoms, for example, heterocyclic groups having a hetero atom (for example, a nitrogen atom, an oxygen atom and a sulfur atom), examples of which include an imidazolyl group, a pyridyl group, a quinolyl group, a furyl group, a piperidyl group, a morpholino group, a benzoxazolyl group, a benzimidazolyl group, a benzthiazolyl group and a 1,3,5-triazyl group); and a silyl group (preferably a silyl group having from 3 to 40 carbon atoms, more preferably a silyl group having from 3 to 30 carbon atoms, and especially preferably a silyl group having from 3 to 24 carbon atoms, for example, a trimethylsilyl group and a triphenylsilyl group). These substituents may be further substituted with a substituent. When two or more substituents are present, these substituents may be the same or different. If possible, these substituents may be taken together to form a ring.

The substituent represented by each of $R^4$, $R^5$, $R^6$, $R^7$, $R^8$ and $R^9$ is preferably an alkyl group, an aryl group, a substituted or unsubstituted amino group, an alkoxy group, an alkylthio group or a halogen atom.

Specific examples of the compound represented by the formula (II) will be given below, but it should not be construed that the invention is limited thereto.

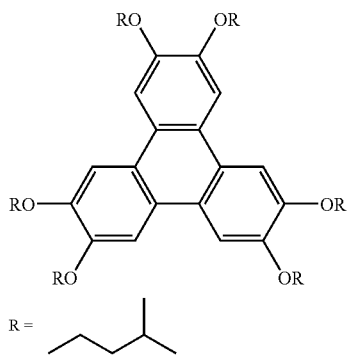

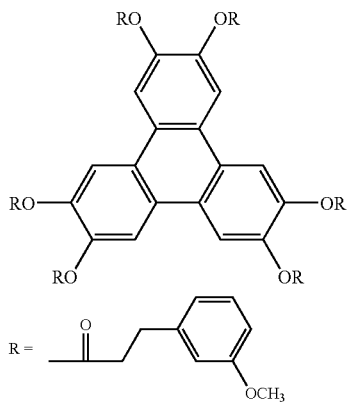

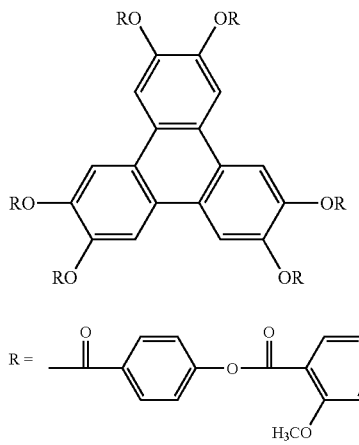

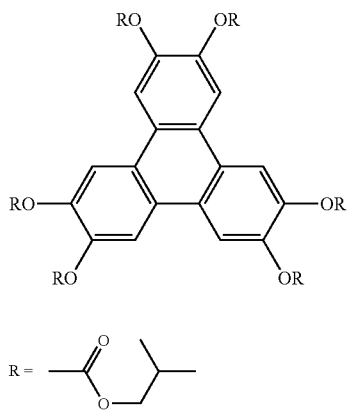

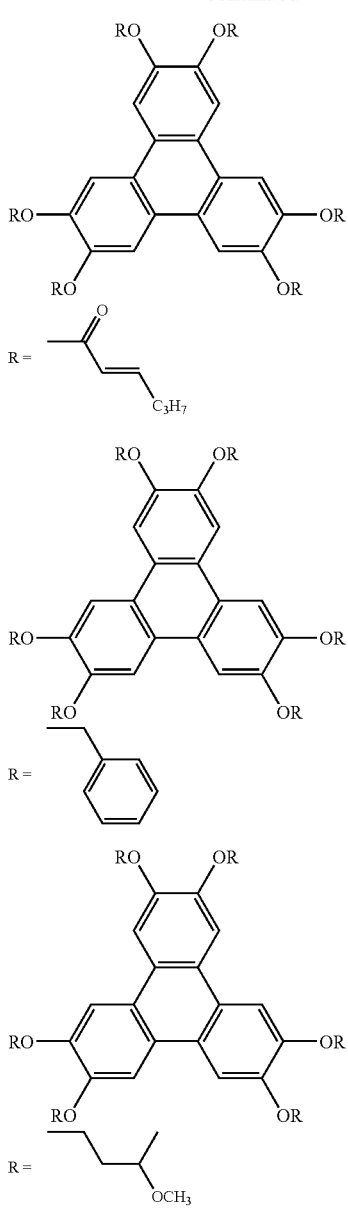

The compound represented by the formula (I) can be synthesized by a known method, for example, a method described in JP-A-2003-344655; and the compound represented by the formula (II) can be synthesized by a known method, for example, a method described in JP-A-2005-134884.

In the invention, besides the foregoing disc-like compound, a rod-like compound having a linear molecular structure can also be preferably used. The terms "linear molecular structure" as referred to herein mean that the molecular structure of the rod-like compound is linear in the most thermodynamically stable structure. The most thermodynamically stable structure can be determined by the crystal structure analysis or molecular orbital calculation. For example, by performing the molecular orbital calculation by using a molecular orbital calculation software (for example, Win-MOPAC2000, manufactured by Fujitsu Inc.), it is possible to determine the molecular structure such that the heat of formation of the compound is the smallest. What the molecular structure is linear means that in the most thermodynamically stable structure, an angle constituted by the principal chain in the molecular structure is 140 degrees or more.

As the rod-like compound having at least two aromatic rings, a compound represented by the following formula (1) is preferable.

Ar1-L1-Ar2    Formula (1)

In the foregoing formula (1), Ar1 and Ar2 each independently represents an aromatic group.

In this specification, examples of the aromatic group include an aryl group (aromatic hydrocarbon group), a substituted aryl group, an aromatic heterocyclic group and a substituted aromatic heterocyclic group.

The aryl group and the substituted aryl group are more preferable than the aromatic heterocyclic group and the substituted aromatic heterocyclic group. The heterocycle of the aromatic heterocyclic group is generally unsaturated. The aromatic heterocycle is preferably a 5-membered ring, a 6-membered ring or a 7-membered ring, and more preferably a 5-membered ring or a 6-membered ring. The aromatic heterocycle generally has the most double bonds. The hetero atom is preferably a nitrogen atom, an oxygen atom or a sulfur atom, and especially preferably a nitrogen atom or a sulfur atom.

The aromatic ring of the aromatic group is preferably a benzene ring, a furan ring, a thiophene ring, a pyrrole ring, an oxazole ring, a thiazole ring, an imidazole ring, a triazole ring, a pyridine ring, a pyrimidine ring or a pyrazine ring, and especially preferably a benzene ring.

Examples of the substituent of the substituted aryl group and the substituted aromatic heterocyclic group include a halogen atom (for example, F, Cl, Br and I); a hydroxyl group; a carboxyl group; a cyano group; an amino group; an alkylamino group (for example, a methylamino group, an ethylamino group, a butylamino group and a dimethylamino group); a nitro group; a sulfo group; a carbamoyl group; an alkylcarbamoyl group (for example, an N-methylcarbamoyl group, an N-ethylcarbamoyl group and an N,N-dimethylcarbamoyl group); a sulfamoyl group; an alkylsulfamoyl group (for example, an N-methylsulfamoyl group, an N-ethylsulfamoyl group and an N,N-dimethylsulfamoyl group); a ureido group; an alkylureido group (for example, an N-methylureido group, an N,N-dimethylureido group and an N,N,N'-trimethylureido group); an alkyl group (for example, a methyl group, an ethyl group, a propyl group, a butyl group, a pentyl group, a heptyl group, an octyl group, an isopropyl group, an s-butyl group, a t-amyl group, a cyclohexyl group and a cyclopentyl group); an alkenyl group (for example, a vinyl group, an allyl group and a hexenyl group); an alkynyl group (for example, an ethynyl group and a butynyl group); an acyl group (for example, a formyl group, an acetyl group, a butyryl group, a hexanoyl group and a lauryl group); an acyloxy group (for example, an acetoxy group, a butyryloxy group, a hexanoyloxy group and a lauryloxy group); an alkoxy group (for example, a methoxy group, an ethoxy group, a propoxy group, a butoxy group, a pentyloxy group, a heptyloxy group and an octyloxy group); an aryloxy group (for example, a phenoxy group); an alkoxycarbonyl group (for example, a methoxycarbonyl group, an ethoxycarbonyl group, a propoxycarbonyl group, a butoxycarbonyl group, a pentyloxycarbonyl group and a heptyloxycarbonyl group); an aryloxycarbonyl group (for example, a phenoxycarbonyl group); an alkoxycarbonylamino group (for example, a butoxycarbonylamino group and a hexyloxycarbonylamino group); an alkylthio group (for example, a methylthio group, an ethylthio group, a propylthio group, a butylthio group, a pentylthio group, a heptylthio group and an octylthio group); an arylthio group (for example, a phenylthio group); an alkylsulfonyl group (for example, a methylsulfonyl group, an ethylsulfonyl group, a propylsulfonyl group, a butylsulfonyl group, a pentylsulfonyl group, a heptylsulfonyl group and an octylsulfonyl group); an amide group (for example, an acetamide group, a butylamide group, a hexylamide group and a laurylamide group); and a non-aromatic heterocyclic group (for example, a morpholino group and a pyrazinyl group).

Of these substituents, a halogen atom, a cyano group, a carboxyl group, a hydroxyl group, an amino group, an alkylamino group, an acyl group, an acyloxy group, an amide group, an alkoxycarbonyl group, an alkoxy group, an alkylthio group and an alkyl group are preferable.

The alkyl moiety and the alkyl group of the alkylamino group, the alkoxycarbonyl group, the alkoxy group and the alkylthio group may further have a substituent. Examples of the substituent of the alkyl moiety and the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amide group and a non-aromatic heterocyclic group. As the substituent of the alkyl moiety and the alkyl group, a halogen atom, a hydroxyl group, an amino group, an alkylamino group, an acyl group, an acyloxy group, an acylamino group, an alkoxycarbonyl group and an alkoxy group are preferable.

In the formula (1), L1 represents a divalent connecting group selected from an alkylene group, an alkenylene group, an alkynylene group, —O—, —CO— and a group composed of a combination thereof.

The alkylene group may have a cyclic structure. The cyclic alkylene group is preferably a cyclohexylene group, and especially preferably a 1,4-cyclohexylene group. As a chain alkylene group, a straight chain alkylene group is more preferable than a branched alkylene group.

The carbon atom number of the alkylene group is preferably from 1 to 20, more preferably from 1 to 15, further preferably from 1 to 10, even more preferably from 1 to 8, and most preferably from 1 to 6.

With respect to the alkenylene group and the alkynylene group, ones having a chain structure are more preferable than ones having a cyclic structure; and ones having a straight chain structure are even more preferable than ones having a branched chain structure.

The carbon atom number of the alkenylene group and the alkynylene group is preferably from 2 to 10, more preferably from 2 to 8, further preferably from 2 to 6, even more preferably from 2 to 4, and most preferably 2 (a vinylene group or an ethynylene group).

The carbon atom number of the arylene group is preferably from 6 to 20, more preferably from 6 to 16, and further preferably from 6 to 12.

In the molecular structure of the formula (1), an angle which Ar1 and Ar2 form while interposing L1 therebetween is preferably 140 degrees or more.

As the rod-like compound, a compound represented by the following formula (2) is more preferable.

Ar1-L2-X-L3-Ar2    Formula (2)

In the foregoing formula (2), Ar1 and Ar2 each independently represents an aromatic group. The definition and examples of the aromatic group are the same as those in Ar1 and Ar2 of the formula (1).

In the formula (2), L2 and L3 each independently represents a divalent connecting group selected from an alkylene group, —O—, —CO— and a group composed of a combination thereof.

With respect to the alkylene group, one having a chain structure is more preferable than one having a cyclic structure; and one having a straight chain structure is even more preferable than one having a branched chain structure.

The carbon atom number of the alkenylene group is preferably from 1 to 10, more preferably from 1 to 8, further preferably from 1 to 6, even more preferably from 1 to 4, and most preferably 1 or 2 (a methylene group or an ethylene group).

L2 and L3 are each especially preferably —O—CO— or —CO—O—.

In the formula (2), X represents a 1,4-cyclohexylene group, a vinylene group or an ethynylene group.

Specific examples of the compound represented by the formula (1) or (2) include compounds described in [Ka 1] to [Ka 11] of JP-A-2004-109657.

Besides, preferred compounds will be given below.

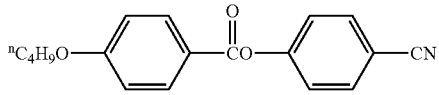

(46)

(47)

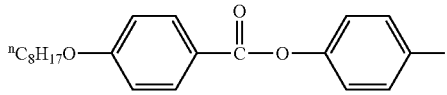

(48)

(49)

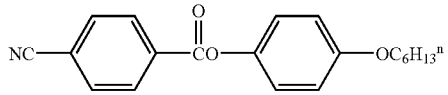

(50)

(51)

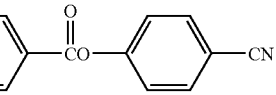

(52)

-continued

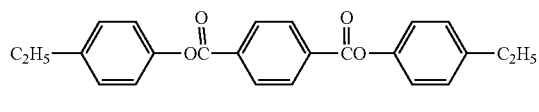
(53)

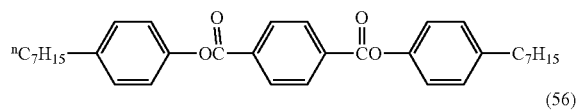
(54)

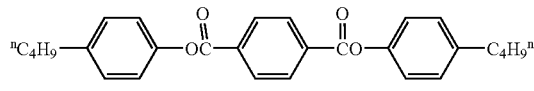
(55)

(56)

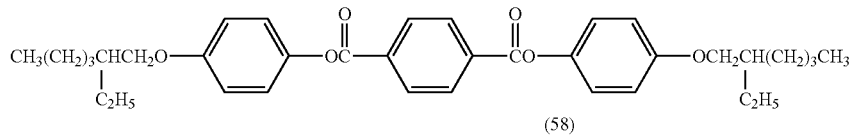
(57)

(58)

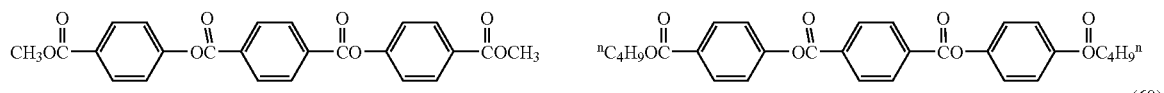
(59)

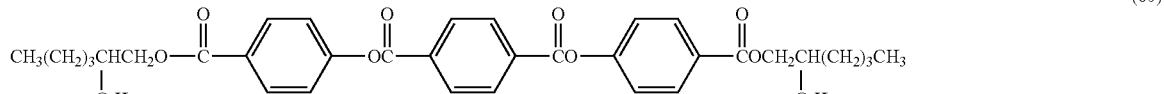
(60)

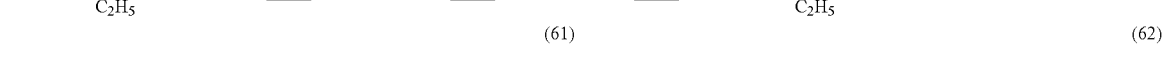
(61)

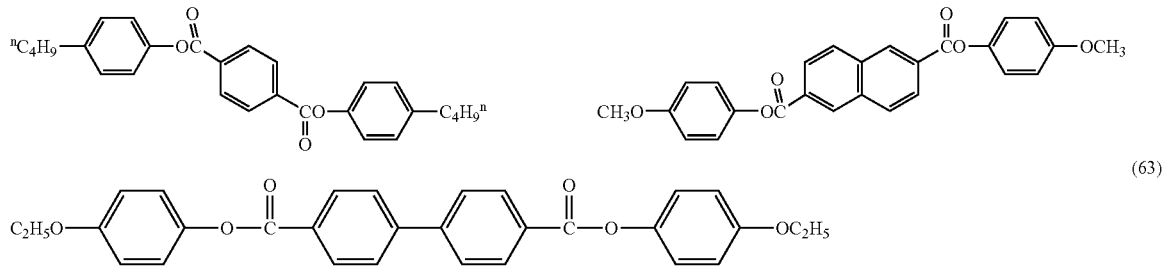
(62)

(63)

The rod-like compound having a maximum absorption wavelength (λmax) in an ultraviolet ray absorption spectrum of a solution thereof of longer than 250 nm may be used in combination of two or more kinds thereof.

The rod-like compound can be synthesized by referring to a method described in a document. Examples of the document include *Mol. Cryst. Liq. Cryst.*, Vol. 53, page 229 (1979); *ibid.*, Vol. 89., page 93 (1982); *ibid.*, Vol. 145, page 111 (1987); *ibid.*, Vol. 170, page 43 (1989); *J. Am. Chem. Soc.*, Vol. 113, page 1349 (1991); *ibid.*, Vol. 118, page 5346 (1996); *ibid.*, Vol. 92, page 1582 (1970); *J. Org. Chem.*, Vol. 40, page 420 (1975); and *Tetrahedron*, Vol. 48, No. 16, page 3437 (1992).

(Matting Agent Fine Particle)

In the cellulose ester film of the invention, it is preferred to add a fine particle as a matting agent. Examples of the fine particle which is used include silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate and calcium phosphate. As the fine particle, one containing silicon is preferable in view of the matter that the turbidity is low, and silicon dioxide is especially preferable. As the fine particle of silicon dioxide, one having an average particle size of primary particle of not more than 20 nm and an apparent specific gravity of 70 g/L or more is preferable. One having a small average particle size of primary particle as from 5 to 16 nm is more preferable because it is able to reduce the haze of the film. The apparent specific gravity is preferably from 90 to 200 g/L or more, and more preferably from 100 to 200 g/L or more. What the apparent specific gravity is large is preferable because a dispersion with high concentration can be prepared, and the haze and the coagulated material are improved.

Such a fine particle usually forms a secondary particle having an average particle size of from 0.1 to 3.0 μm. The fine particle exists as a coagulated material of the primary particle in the film and forms irregularities of from 0.1 to 3.0 μm on the film surface. The average particle size of the secondary particle is preferably 0.2 μm or more and not more than 1.5 μm, more preferably 0.4 μm or more and not more than 1.2 μm, and most preferably 0.6 μm or more and not more than 1.1 μm. The primary or secondary particle size of the fine particle was defined in terms of a diameter of a circle which touches externally the particle upon observation of the particle in the film by a scanning electron microscope. Also, by changing the place and observing 200 particles, its average value was defined as an average particle size.

As the fine particle of silicon dioxide, commercially available products such as AEROSIL R972, R972V, R974, R812, 200, 200V, 300, R202, OX50 and TT600 (all of which are manufactured by Nippon Aerosil Co., Ltd.) can be used. The fine particle of zirconium oxide is commercially available as a trade name, for example, AEROSIL R976 and R811 (all of which are manufactured by Nippon Aerosil Co., Ltd.), and these products can be used.

Of these, AEROSIL 200V and AEROSIL R972V are especially preferable because they are a fine particle of silicon dioxide having an average particle size of primary particle of not more than 20 nm and an apparent specific gravity of 70 g/L or more and have a large effect for reducing a coefficient of friction while keeping the turbidity of an optical film low.

In the invention, in order to obtain a cellulose ester film containing a particle having a small average particle size of secondary particle, some methods can be thought in preparing a dispersion of a fine particle. For example, there is a method in which a fine particle dispersion having a solvent and a fine particle stirred and mixed therein is previously prepared, this fine particle dispersion is added in a small amount of a separately prepared cellulose acylate solution and stirred for dissolution, and the mixture is then mixed with the main cellulose acylate dope solution. This method is a preferred preparation method from the standpoints that the dispersibility of the silicon dioxide fine particle is good and that the silicon dioxide fine particle is further hardly recoagulated. Besides, there is a method in which a small amount of a cellulose ester is added in a solvent and stirred for dissolution; a fine particle is then added thereto; the mixture is dispersed by a dispersing machine to form a fine particle addition solution; and this fine particle addition solution is thoroughly mixed with a dope solution in an in-line mixer. It should not be construed that the invention is limited to these methods. When the silicon dioxide fine particle is mixed and dispersed in a solvent or the like, the concentration of silicon oxide is preferably from 5 to 30% by mass, more preferably from 10 to 25% by mass, and most preferably from 15 to 20% by mass. What the dispersion concentration is high is preferable in view of the matters that the turbidity of the liquid relative to the addition amount is low and that the haze and the coagulated material are improved. The addition amount of the matting agent in the final dope solution of the cellulose acylate is preferably from 0.01 to 1.0 g, more preferably from 0.03 to 0.3 g, and most preferably from 0.08 to 0.16 g per 1 m$^2$.

As the solvent to be used, lower alcohols are exemplified. Preferred examples thereof include methyl alcohol, ethyl alcohol, propyl alcohol, isopropyl alcohol and butyl alcohol. Other solvents than the lower alcohol are not particularly limited. It is preferred to use the solvent which is used at the fabrication of a cellulose ester.

The cellulose ester film of the invention can be preferably used as a passivation film for polarizing plate in a polarizing plate because it has water barrier properties and has a low moisture content. As described previously, the polarizing plate is formed by sticking and stacking a passivation film for polarizing plate on at least one surface of a polarizer. As the polarizer, ones which have hitherto been known can be used. For example, a polarizer prepared by treating a hydrophilic polymer film such as polyvinyl alcohol films with a dichroic dye such as iodine and stretching can be used. Though sticking of the cellulose ester film and the polarizer is not particularly limited, it can be performed by using an adhesive composed of an aqueous solution of a water-soluble polymer. As this water-soluble polymer adhesive, an aqueous solution of polyvinyl alcohol of a complete saponification type is preferably used.

The cellulose ester film of the invention can be preferably used in a configuration of passivation film for polarizing plate/polarizer/passivation film for polarizing plate/liquid crystal cell/cellulose ester film of the invention/polarizer/passivation film for polarizing plate, or a configuration of passivation film for polarizing plate/polarizer/cellulose ester film of the invention/liquid crystal cell/cellulose ester film of the invention/polarizer/passivation film for polarizing plate. In particular, by sticking the cellulose ester film of the invention to a liquid crystal cell of, for example, a TN type, a VA type or an OCB type, it is possible to provide a display which is more excellent in viewing angle, less in coloration and excellent in visibility. In particular, a polarizing plate using the cellulose ester of the invention is less in deterioration under a high-temperature and high-humidity condition and is able to keep the performance stable over a long period of time.

[Production of Cellulose Ester Film]

The foregoing cellulose ester film can be produced by any method so far as it is able to usually prepare a cellulose ester film. In particular, it is preferable that the cellulose ester film is produced by a solvent casting method. In the solvent casting method, a film can be produced by using a solution (dope) having a cellulose acylate dissolved in an organic solvent.

It is preferable that the organic solvent includes a solvent selected from ethers having from 3 to 12 carbon atoms, ketones having from 3 to 12 carbon atoms, esters having from 3 to 12 carbon atoms and halogenated hydrocarbons having from 1 to 6 carbon atoms. The ether, the ketone and the ester may each have a cyclic structure. Compounds having two or more functional groups of the ether, the ketone or the ester (namely, —O—, —CO— and —COO—) can also be used as the organic solvent. The organic solvent may have other functional group, for example, an alcoholic hydroxyl group. In the case of an organic solvent having two or more kinds of functional groups, the carbon atom numbers may fall within the defined range of a compound having any one of the functional groups.

Examples of the ether having from 3 to 12 carbon atoms include diisopropyl ether, dimethoxymethane, dimethoxyethane, 1,4-dioxane, 1,3-dioxolane, tetrahydrofuran, anisole and phenetole.

Examples of the ketone having from 3 to 12 carbon atoms include acetone, methyl ethyl ketone, diethyl ketone, diisobutyl ketone, cyclohexanone and methylcyclohexanone.

Examples of the ester having from 3 to 12 carbon atoms include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The carbon atom number of the halogenated hydrocarbon is preferably 1 or 2, and most preferably 1. The halogen of the halogenated hydrocarbon is preferably chlorine. The proportion at which the hydrogen atom of the halogenated hydrocarbon is substituted with a halogen is preferably from 25 to 75% by mole, more preferably from 30 to 70% by mole, further preferably from 35 to 65% by mole, and most preferably from 40 to 60% by mole. Methylene chloride is a representative halogenated hydrocarbon.

A mixture of two or more kinds of organic solvents may also be used.

The cellulose acylate solution can be prepared by a general method. The "general method" as referred to herein means a treatment at a temperature of 0° C. or higher (ordinary temperature or high temperatures). The preparation of the solution can be carried out by using a preparation method of a dope and an apparatus in a usual solvent casting method. In the case of a general method, it is preferred to use a halogenated hydrocarbon (in particular, methylene chloride) as the organic solvent.

The cellulose acylate solution is prepared in such a manner that the cellulose acylate is contained in the solution in an amount of from 10 to 40% by mass. The amount of the cellulose acylate is preferably from 10 to 30% by mass. An arbitrary additive as described later may be added in the organic solvent (prime solvent).

The solution can be prepared by stirring a cellulose acylate and an organic solvent at ordinary temperature (from 0 to 40° C.). The solution with high concentration may be stirred under a pressure and heating condition. Concretely, a cellulose acylate and an organic solvent are charged in a pressure vessel and sealed, and the mixture is stirred while heating at a temperature in the range of a boiling point of the solvent at ordinary temperature or higher under pressure and not higher than a temperature at which the solvent does not boil. The heating temperature is usually 40° C. or higher, preferably from 60 to 200° C., and more preferably from 80 to 110° C.

The respective components may be roughly mixed in advance and then charged in a vessel. Also, the components may be thrown into the vessel successively. The vessel is required to be configured such that stirring can be achieved. The vessel can be pressurized by injecting an inert gas such as a nitrogen gas thereinto. Also, an increase of a vapor pressure of the solvent due to heating may be utilized. Alternatively, after sealing the vessel, the respective components may be added under pressure.

In the case of heating, it is preferable that the heating is carried out from the outside of the vessel. For example, a jacket type heating device can be used. Also, the whole of the vessel can be heated by providing a plate heater in the outside of the vessel, piping and circulating a liquid.

It is preferred to provide a stirring blade in the inside of the vessel and achieve stirring by using this. The stirring blade is preferably one having a length such that it reaches in the vicinity of a wall of the vessel. It is preferable that a scraping blade is provided at the terminal end of the stirring blade for the purpose of renewing a liquid film of the wall of the vessel.

Measuring instruments such as a pressure gauge and a thermometer may be provided in the vessel. In the vessel, the respective components are dissolved in a solvent. The prepared dope is cooled and then taken out from the vessel, or taken out from the vessel and then cooled by using a heat exchanger or the like.

The solution can also be prepared by a cooling dissolution method. According to the cooling dissolution method, the cellulose acylate can be dissolved even in an organic solvent in which it is difficult to dissolve the cellulose acylate in a usual dissolution method. According to the cooling dissolution method, there is brought an effect that a uniform solution can be rapidly obtained even by using a solvent capable of dissolving the cellulose acylate therein in a usual dissolution method.

In the cooling dissolution method, first of all, a cellulose acylate is gradually added in an organic solvent at room temperature while stirring. It is preferable that the amount of the cellulose acylate is adjusted such that from 10 to 40% by mass of the cellulose acylate is contained in this mixture. The amount of the cellulose acylate is more preferably from 10 to 30% by mass. Furthermore, an arbitrary additive as described later may be added in the mixture.

Next, the mixture is cooled to a temperature of from −100 to −10° C. (preferably from −80 to −10° C., more preferably from −50 to −20° C., and most preferably from −50 to −30° C.). The cooling can be carried out in, for example, a dry ice/methanol bath (−75° C.) or a cooled diethylene glycol solution (from −30 to −20° C.). By performing cooling in such a manner, the mixture of a cellulose acylate and an organic solvent is solidified.

A cooling rate is preferably 4° C./min or more, more preferably 8° C./min or more, and most preferably 12° C./min or more. It is preferable that the cooling rate is as fast as possible. However, 10,000° C./sec is a theoretical limit; 1,000° C./sec is a technical limit; and 100° C./sec is a practical limit. The cooling rate is a value obtained by dividing a difference between a temperature at which cooling is started and a final cooling temperature by a time of from the start of cooling to the arrival at the final cooling temperature.

When the resulting mixture is further heated to a temperature of from 0 to 200° C. (preferably from 0 to 150° C., more preferably from 0 to 120° C., and most preferably from 0 to 50° C.), the cellulose acylate is dissolved in the organic solvent. The temperature rise may be achieved by merely allowing the mixture to stand at room temperature or by heating in a warm bath. A temperature rise rate is preferably 4° C./min or more, more preferably 8° C./min or more, and most preferably 12° C./min or more. It is preferable that the temperature rise rate is as fast as possible. However, 10,000° C./sec is a theoretical limit; 1,000° C./sec is a technical limit; and 100° C./sec is a practical limit. The temperature rise rate is a value obtained by dividing a difference between a temperature at which heating is started and a final heating temperature by a time of from the start of heating to the arrival at the final heating temperature.

A uniform solution is thus obtained in the foregoing manner. In the case where the dissolution is insufficient, the cooling or heating operation may be repeated. Whether or not the dissolution is sufficient can be judged merely by visual observation of the appearance of the solution.

In the cooling dissolution method, in order to avoid the incorporation of moisture due to dew condensation at the cooling, it is desired to use a sealed vessel. In the cooling or heating operation, when pressurization is carried out at the cooling, or evacuation is carried out at the heating, the dissolution time can be shortened. In order to carry out the pressurization or evacuation, it is desired to use a pressure vessel.

In a 20% by mass solution obtained by dissolving a cellulose acylate (acetylation degree: 60.9%, viscosity average polymerization degree: 299) in methyl acetate by a cooling dissolution method, according to differential scanning calorimetry (DSC), a pseudo-phase transition point between a sol state and a gel state exists in the vicinity of 33° C., and the solution becomes in a uniform gel state at a temperature of no higher than this temperature. Accordingly, this solution is required to be stored at a temperature of the pseudo-phase transition temperature or higher, and preferably a temperature of about 10° C. higher than the gel phase transition temperature. However, this pseudo-phase transition temperature varies with the acylation degree and viscosity average polymerization degree of the cellulose acylate, the solution concentration and the organic solvent to be used.

A cellulose acylate film can be produced from the prepared cellulose acylate solution (dope) by a solvent casting method.

The dope is cast on a drum or a band, and the solvent is vaporized to form a film. It is preferable that the concentration of the dope before casting is adjusted in the range of from 18 to 35% in terms of a solids content. It is preferable that the surface of the drum or band is mirror-finished. The casting and drying method in the solvent casting method is described in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430, and JP-A-62-115035.

It is preferable that the dope is cast on a drum or a band having a surface temperature of no higher than 10° C. It is preferable that after casting, air is blown for 2 seconds or more to achieve drying. Also, the resulting film is stripped off from the drum or band and further dried by high-temperature air while successively changing the temperature from 100° C. to 160° C., whereby the residual solvent can be evaporated. The foregoing method is described in JP-B-5-17844. According to this method, it is possible to shorten a time of from casting to stripping-off. In order to achieve this method, it is necessary that the dope is gelled at the surface temperature of the drum or band at the casting.

In order to improve the mechanical physical properties or enhance the drying rate, a plasticizer can be added in the cellulose ester film. As the plasticizer, a phosphoric ester or a carboxylic acid ester is used. Examples of the phosphoric ester include triphenyl phosphate (TPP) and tricresyl phosphate (TCP). As the carboxylic acid, a phthalic ester and a citric ester are representative. Examples of the phthalic ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric ester include triethyl O-acetylcitrate (OACTE) and tributyl O-acetylcitrate (OACTB). Examples of other carboxylic acid esters include butyl oleate, methylacetyl ricinolate, dibutyl sebacate and various trimellitic esters. Phthalic ester based plasticizers (for example, DMP, DEP, DBP, DOP, DPP and DEHP) are preferably used. DEP and DPP are especially preferable.

The addition amount of the plasticizer is preferably from 0.1 to 25% by mass, more preferably from 1 to 20% by mass, and most preferably from 3 to 15% by mass relative to the amount of the cellulose acylate.

In the cellulose ester film, a deterioration preventive agent (for example, an antioxidant, a peroxide decomposing agent, a radical inhibitor, a metal inactivating agent, an acid scavenger and an amine) may be added. The deterioration preventive agent is described in JP-A-3-199201, JP-A-5-197073, JP-A-5-194789, JP-A-5-271471 and JP-A-6-107854. From the viewpoints of revealing an effect by the addition of the deterioration preventive agent and suppressing bleed-out of deterioration preventive agent onto the film surface, the addition amount of the deterioration preventive agent is preferably from 0.01 to 1% by mass, and more preferably from 0.01 to 0.2% by mass relative to the solution (dope) to be prepared. Examples of the especially preferred deterioration preventive agent include butylated hydroxytoluene (BHT) and tribenzylamine (TBA).

The drying method of a web which has been dried on a drum or a band and stripped off is hereunder described. The web which has been stripped off at a stripping-off position just before the drum or band goes round is traveled by a method for traveling the web by alternately passing it through a group of rolls arranged in a staggered state; a method for traveling the web in a non-contact manner while gripping the both ends of the web by clips or the like; or other methods. Drying is carried out by a method for blowing air of a prescribed temperature onto both surfaces of the traveling web (film); or a method using heating means such as microwave heating. There is a possibility that rapid drying impairs the flatness of the film to be formed. Accordingly, it is preferable that at the initial stage of drying, the web is dried at a temperature to a degree that the solvent does not cause foaming and that after drying has advanced, the web is dried at a high temperature. In a drying step after the film has been stripped off from the support, the film is liable to shrink in a longitudinal direction or width direction due to evaporation of the solvent. The higher the drying temperature, the larger the shrinkage is. For the purpose of making the flatness of the resulting film good, it is preferred to achieve drying while suppressing this shrinkage as far as possible. From this standpoint, a method for performing the drying step entirely or partly while holding both width ends of the web by clips or pins in a width direction (tenter mode) as described in, for example, JP-A-62-46625 is preferable. The drying temperature in the foregoing drying step is preferably from 100 to 145° C. Though the drying temperature, the amount of drying air and the drying time vary with the solvent to be used, they may be properly chosen depending upon the kind of the solvent to be used or a combination thereof. In the production process of the cellulose ester film of the invention, it is preferred to stretch the web (film) stripped off from the support at a time when the amount of the residual solvent in the web is less than 120% by mass. It is especially preferred to stretch the web (film) from 1.2 to 2.0 times in at least one direction during a time when the amount of the residual solvent in the web is in the range of from 10 to 100% by mass.

The amount of the residual solvent is represented by the following expression.

$$\{\text{Amount of residual solvent (\% by mass)}\}=\{(M-N)/N\}\times 100$$

Here, M represents a mass of the web at an arbitrary point of time; and N represents a mass of the web when the web, M of which has been measured, is dried at 110° C. for 3 hours. When the amount of the residual solvent in the web is too large, the effect of stretching is not obtained; whereas when it is too small, stretching becomes extremely difficult, whereby breakage of the web may be possibly caused. The amount of the residual solvent in the web is more preferably in the range of from 10% by mass to 50% by mass, in particular, most preferably in the range of from 12% by mass to 30% by mass. Also, when a stretch ratio is too small, a sufficient phase difference is not obtained; whereas when it is too large, stretching becomes difficult, whereby breakage of the web may be possibly caused. The stretch ratio is preferably in the range of from 1.2 times to 2.0 times, and more preferably from 1.3 times to 1.5 times. A film obtained by solution casting and fabrication using the cellulose ester of the invention can be stretched even when the film is not heated at a high temperature so far as the amount of the residual solvent falls within a specified range. What drying and stretching are served together is preferable because the step becomes short. However, when the temperature of the web is too high, the plasticizer is vaporized. Accordingly, the temperature is preferably in the range of room temperature (15° C.) or higher and no higher than 145° C. Also, for the purpose of making the refractive indexes Nx, Ny and Nz of the film fall with the range of the invention, it is an effective method to perform stretching in biaxial directions orthogonal to each other. For example, in the case where stretching is performed in a casting direction, when the shrinkage in a width direction is too large, a value of Nz becomes excessively large. In that case, the width shrinkage of the film can be suppressed, or it can be improved by also stretching in a width direction. In the case where stretching is performed in a width direction, there is a possibility that distribution in refractive index is generated in the width direction. This may be seen in, for example, the case of employing a tenter method and is thought to be a phenomenon caused by the matter that by stretching in the width direction, a shrinkage force is generated in the film center and the ends are fixed, a so-called "bowing phenomenon". Even in that case, by stretching in a casting direction, the bowing phenomenon can be suppressed, whereby an improvement can be made such that the distribution in phase difference in a width direction is minimized. In addition, a fluctuation in thickness of the film obtained by stretching in biaxial directions orthogonal to each other can be reduced. When the fluctuation in thickness of the optical film is too large, unevenness in the phase difference is generated. The fluctuation in thickness of the optical film is preferably within the range of ±3%, and more preferably within the range of ±1%.

In the foregoing object, a method of stretching in biaxial directions orthogonal to each other is effective, and stretch ratios in biaxial directions orthogonal to each other are preferably in the range of from 1.2 to 2.0 times and in the range of from 0.7 to 1.0 time, respectively. Here, what the film is stretched from 1.2 to 2.0 times in one of the directions and from 0.7 to 1.0 time in the other direction orthogonal thereto means that an interval between clips or pins supporting the film is in the range of from 0.7 to 1.0 times the interval before stretching.

In general, in the case where the film is stretched by using a biaxial stretching tenter such that the interval is from 1.2 to 2.0 times in the width direction, a shrinking force acts in a longitudinal direction which is a rectangular direction thereto.

Accordingly, it is meant that when the film is stretched by continuously applying a force only in one direction, though the width in a rectangular direction thereto is shrunk, the shrinkage amount is suppressed relative to the shrinkage amount without regulating the width and that the interval between clips or pins for regulating the width is regulated within the range of from 0.7 to 1.0 times that before stretching. At that time, a force acts in the longitudinal direction due to the stretching in the width direction such that the film is shrunk. By taking an interval between clips or pins in the longitudinal direction, a tension beyond the necessity is not applied in the longitudinal direction. A method for stretching the web is not particularly limited. Examples thereof include a method in which a difference in circumferential speed is applied in plural rolls, and the web is stretched in a longitudinal direction by utilizing the difference in circumferential speed between the rolls; a method in which the both ends of the web are fixed by clips or pins, and the web is stretched in a longitudinal direction while widening an interval between the clips or pins in an advancing direction; a method in which the web is similarly stretched in a lateral direction while widening the interval in the lateral direction; and a method in which the web is stretched in both longitudinal and lateral directions while simultaneously widening the interval in the both longitudinal and lateral directions. As a matter course, these methods may be combined and employed. Also, in the case of a so-called tenter method, when a clip portion is driven in a linear drive mode, smooth stretching can be achieved and risks such as breakage can be reduced. Therefore, this case is preferable.

[Production Process of Cellulose Ester Film of the Invention]

The cellulose ester film of the invention can be efficiently produced by the production process of the invention as described below in detail.

The production process of a cellulose ester film of the invention comprises a fabrication step of casting a solution having a cellulose ester dissolved in an organic solvent on a support and evaporating the solvent to form a cellulose ester film; a stretching step of subsequently stretching the film; and a drying step of drying the resulting film, which further includes a step of, after completion of the drying step, performing a heat treatment at a temperature of from 150 to 200° C. for one minute or more.

(Fabrication Step, Stretching Step and Drying Step)

As the fabrication step, stretching step and drying step, the foregoing methods can be employed.

In the production process of the invention, a film stretch ratio (also referred to as "stretch ratio") in the stretching step is preferably from 1.2 to 2.0 times, and more preferably from 1.3 to 1.5 times.

(Heat Treatment Step)

As described previously, the production process of the film of the invention is characterized by providing a heat treatment step after completion of the drying step. The heat treatment in the heat treatment step may be carried out after completion of the drying step. The heat treatment may be carried out immediately after the stretching/drying step, or may be carried out in such a manner that after completion of the drying step, the film is once wound up in a method as describe later, and only a heat treatment step is separately provided. In the invention, it is preferable that after completion of the drying step, the film is cooled to a temperature of room temperature or higher and no higher than 100° C., and the foregoing heat treatment step is then again provided. This is because an advantage is brought in view of the matter that a film which is more excellent in heat dimensional stability is obtainable. For the same reason, it is preferable that immediately before the heat treatment step, the film is dried to such a degree that the amount of the residual solvent is less than 2% by mass, and preferably less than 0.4% by mass.

Though the reason why a shrinkage factor of the film can be minimized by the invention is not elucidated yet, it is assumed that since in the film which has been stretched in the stretching step, a residual stress in the stretching direction is large, the foregoing residual stress is cancelled due to the heat treatment, whereby a shrinking force in a region of no higher than the heat treatment temperature is reduced.

The heat treatment is carried out by a method for blowing air of a prescribed temperature onto the traveling film; or a method using heating means such as microwave heating.

The heat treatment is carried out preferably at a temperature of from 150 to 200° C., and more preferably at a temperature of from 160 to 180° C.; and the heat treatment is carried out preferably for from 1 to 20 minutes, and more preferably for from 5 to 10 minutes.

When the heating is carried out at a heat treatment temperature exceeding 200° C. for a long period of time, there is a problem because a scattering amount of the plasticizer to be contained in the film increases.

In the foregoing heat treatment step, the film is shrunk in the longitudinal direction or in the width direction. For the purpose of making the flatness of the resulting film good, it is preferred to achieve the heat treatment while suppressing this shrinkage as far as possible. A method for performing the heat treatment while holding both width ends of the web by clips or pins in a width direction (tenter mode) is preferable. In addition, it is preferred to perform stretching from 0.9 times to 1.5 times in the width direction and the traveling direction of the film, respectively.

As a winder for winding up the resulting cellulose ester film, a generally used winder can be used; and the cellulose ester film can be wound up by a winding method, for example, a constant-tension method, a constant-torque method, a taper tension method and a program tension control method in which an internal stress is constant. In the thus obtained optical film roll, the slow axis direction of the film falls preferably within the range of ±2 degrees, and more preferably within the range of ±1 degree relative to the winding direction (longitudinal direction of the film). Alternatively, the slow axis direction of the film falls preferably within the range of ±2 degrees, and more preferably within the range of ±1 degree relative to the rectangular direction (width direction of the film) to the winding direction. In particular, the slow axis direction of the film falls preferably within the range of ±0.1 degree relative to the winding direction (longitudinal direction of the film). Alternatively, the slow axis direction of the film falls preferably within the range of ±0.1 degree relative to the width direction of the film.

In the thus obtained film, for the purpose of obtaining a film having good dimensional stability, the amount of the residual solvent of the finally finished film is preferably not more than 1% by mass, and more preferably not more than 0.2% by mass.

It is preferable that the film has a thickness of from 20 to 100 μm.

It is preferable that the thus obtained optical film is used as a passivation film for polarizing plate having a phase difference; and it is preferable that the slow axis of the optical film and the absorption axis of the polarizer are arranged orthogonal to each other. The term "orthogonal" means that the both axes are crossed at an angle of from 80 to 100 degrees, preferably at an angle of from 85 to 95 degrees, and especially preferably at an angle of 90±1 degrees. The thickness of the finished optical film (after drying) of the invention can be adjusted so as to have a desired value by adjusting the concentration of solids contained in the dope, the slit interval of a nozzle of a die, the extrusion pressure from a die, the speed of the support and the like.

The cellulose ester film of the invention can be used for an optical compensation sheet composed of the subject film; and the polarizing plate using the subject film can be used for a liquid crystal cell or a liquid crystal display of every display mode. Various display modes, for example, a TN (twisted nematic) mode, an IPS (in-plane switching) mode, an FLC (ferroelectric liquid crystal) mode, an AFLC (anti-ferroelectric liquid crystal) mode, an OCB (optically compensatory bend) mode, an STN (super twisted nematic) mode, a VA (vertically aligned) mode and an HAN (hybrid aligned nematic) mode are proposed.

A liquid crystal cell of an OCB mode is a liquid crystal display using a liquid crystal cell of a bend alignment mode in which a rod-like liquid crystalline molecule is aligned in directions substantially reverse to each other (in a symmetric manner) in the upper and lower parts of a liquid crystal cell. The liquid crystal of an OCB mode is disclosed in U.S. Pat. Nos. 4,583,825 and 5,410,422. Since the rod-like liquid crystal molecule is symmetrically aligned in the upper and lower parts of a liquid crystal cell, the liquid crystal cell of a bend alignment mode has a self optical compensation function. A liquid crystal display of a bend alignment mode involves an advantage that the response speed is fast.

In a liquid crystal cell of a VA mode, a rod-like liquid crystalline molecule is substantially vertically aligned at the time of applying no voltage.

The liquid crystal cell of a VA mode includes, in addition to (1) a liquid crystal cell of a VA mode in a narrow sense in which a rod-like liquid crystalline molecule is substantially vertically aligned at the time of applying no voltage, whereas it is substantially horizontally aligned at the time of applying a voltage (as described in JP-A-2-176625), (2) a liquid crystal cell of a multi-domained VA mode (MVA mode) for enlarging a viewing angle (as described in SID 97, Digest of Tech. Papers, 28 (1997), page 845); (3) a liquid crystal cell of a mode in which a rod-like liquid crystalline molecule is substantially vertically aligned at the time of applying no voltage and is subjected to twisted multi-domain alignment at the time of applying a voltage (n-ASM mode) (as described in Sharp Technical Report, No. 80, page 11); and (4) a liquid crystal cell of a SURVIVAL mode (as described in Monthly Display, May, page 14 (1999)).

A liquid crystal display of a VA mode is composed of a liquid crystal cell and two polarizing plates disposed on the both sides thereof. The liquid crystal cell supports a liquid crystal between two electrode substrates. In an embodiment of a transmission type liquid crystal display of the invention, one optical compensation sheet of the invention is arranged between a liquid crystal cell and one polarizing plate, or two optical compensation sheets of the invention are arranged between a liquid crystal cell and each of both polarizing plates.

In another embodiment of the transmission type liquid crystal display of the invention, an optical compensation sheet composed of the cellulose ester film of the invention is used as a transparent passivation film of polarizing plate to be arranged between a liquid crystal cell and a polarizer. The foregoing optical compensation sheet may be used only for the transparent passivation film of one polarizing plate (between the liquid crystal cell and the polarizer), or the foregoing optical compensation sheet may be used for the two passivation films of the both polarizing plates (between the liquid crystal cell and the polarizer). In the case where the foregoing optical compensation sheet is used only for one polarizing plate, it is especially preferable that it is used as a passivation film on the liquid crystal cell side of the polarizing plate on a backlight side of the liquid crystal cell. In sticking to the liquid crystal cell, it is preferable that the cellulose ester film of the invention is faced at the VA cell side. The passivation film may be a usual cellulose ester film, and it is preferable that such a cellulose ester film is thinner than the cellulose ester film of the invention. For example, its thickness is preferably from 40 to 80 μm, and examples of the cellulose ester film include commercially available products, for example, KC4UX2M (40 μm in thickness, manufactured by Konica Opto Corp.), KC5UX (60 μm in thickness, manufactured by Konica Opto Corp.) and TD80 (80 μm in thickness, manufactured by Fujifilm Corporation). However, it should not be construed that the invention is limited thereto.

EXAMPLES

The invention is specifically described below with reference to the following Examples, but it should not be construed that the invention is limited thereto.

Examples and Comparative Examples

Fabrication of Cellulose Ester Films 1 to 9

(1) Cellulose Acylate:

Cellulose acylates having different kind and degree of substitution of an acyl group as shown in Table 1 were prepared. That is, sulfuric acid (7.8 parts by mass based on 100 parts by mass of cellulose) was added as a catalyst, a carboxylic acid as a raw material of an acyl substituent was added, and an acylation reaction was carried out at 40° C. As that this, by adjusting the kind and amount of the carboxylic acid, the kind and degree of substitution of the acyl group were adjusted. Also, after the acylation, ripening was carried out at 40° C. Furthermore, a low-molecular weight component of this cellulose acylate was removed by washing with acetone. In Table 1, the term "CAP" is an abbreviation of cellulose acetate propionate (a cellulose ester derivative in which the acyl group is composed of an acetate group and a propionyl group); and the term "TAC" means cellulose triacetate (a cellulose ester derivative in which the acyl group is composed of only an acetate group).

TABLE 1

| Cellulose ester film | | Example Film 1 | Example Film 2 | Example Film 3 | Example Film 4 | Example Film 5 | Example Film 6 |
|---|---|---|---|---|---|---|---|
| Cotton | Kind of cotton | CAP | CAP | CAP | TAC | TAC | TAC |
| | Total degree of substitution | 2.7 | 2.4 | 2.4 | 2.4 | 2.81 | 2.81 |
| | Degree of substitution of Ac | 1.9 | 1.6 | 1.6 | 2.4 | 2.81 | 2.81 |
| | Degree of substitution of Pr | 0.8 | 0.8 | 0.8 | 0 | 0 | 0 |
| | Degree of substitution at the 6-position | 0.89 | 0.77 | 0.77 | 0.77 | 0.9 | 0.9 |
| | Rate of substitution at the 6-position | 0.330 | 0.321 | 0.321 | 0.321 | 0.320 | 0.320 |
| Plasticizer | Kind of plasticizer | C/D | C/D | C/D | A/B | A/B | A/B |
| | Amount of plasticizer (based on 100 parts by mass of cotton) | 3.5/5 | 3.5/5 | 3.5/5 | 7.8/3.9 | 7.8/3.9 | 7.8/3.9 |
| | Addition amount of Re developing agent (based on 100 parts by mass of cotton) | 0 | 0 | 0 | 0 | 4.5 | 7.5 |
| Stretching condition | Stretch ratio | 1.30 | 1.40 | 1.50 | 1.40 | 1.40 | 1.25 |
| Heat treatment condition | Heat treatment temperature [° C.] | 150 | 150 | 160 | 150 | 160 | 150 |
| | Heat treatment time [min] | 1 | 1 | 5 | 1 | 5 | 1 |
| Physical properties of film | Thickness [μm] | 80 | 40 | 40 | 40 | 50 | 80 |
| | Re [nm] | 45 | 50 | 45 | 50 | 50 | 55 |
| | Rth [nm] | 125 | 120 | 115 | 130 | 125 | 200 |
| | ΔRe [nm] | 4 | 6 | 5 | 12 | 3 | 4 |
| | ΔRth [nm] | 8 | 12 | 10 | 18 | 10 | 18 |
| | Glass transition temperature [° C.] | 140 | 140 | 140 | 135 | 145 | 135 |
| | Shrinkage factor | 0 | 0.3 | 0 | 0.8 | 0.5 | 0.5 |

| Cellulose ester film | | Example Film 7 | Example Film 8 | Comparative Example Film 9 | Comparative Example Film 10 | Comparative Example Film 11 |
|---|---|---|---|---|---|---|
| Cotton | Kind of cotton | TAC | TAC | TAC | TAC | CAP |
| | Total degree of substitution | 2.81 | 2.87 | 2.81 | 2.81 | 2.7 |
| | Degree of substitution of Ac | 2.81 | 2.87 | 2.81 | 2.81 | 1.9 |
| | Degree of substitution of Pr | 0 | 0 | 0 | 0 | 0.8 |
| | Degree of substitution at the 6-position | 0.9 | 0.9 | 0.9 | 0.9 | 0.89 |
| | Rate of substitution at the 6-position | 0.320 | 0.314 | 0.320 | 0.320 | 0.330 |
| Plasticizer | Kind of plasticizer | A/B | A/B | A/B | A/B | C/D |
| | Amount of plasticizer (based on 100 parts by mass of cotton) | 7.8/3.9 | 7.8/3.9 | 7.8/3.9 | 7.8/3.9 | 3.5/5 |
| | Addition amount of Re developing agent (based on 100 parts by mass of cotton) | 4.5 | 4.5 | 4.5 | 7.5 | 0 |
| Stretching condition | Stretch ratio | 1.35 | 1.40 | 1.30 | 1.25 | 1.30 |
| Heat treatment condition | Heat treatment temperature [° C.] | 150 | 150 | — | — | 120 |
| | Heat treatment time [min] | 1 | 1 | — | — | 1 |
| Physical properties of film | Thickness [μm] | 50 | 50 | 50 | 80 | 80 |
| | Re [nm] | 45 | 30 | 45 | 55 | 45 |
| | Rth [nm] | 120 | 110 | 125 | 220 | 125 |
| | ΔRe [nm] | 3 | 3 | 8 | 10 | 10 |
| | ΔRth [nm] | 10 | 9 | 15 | 24 | 16 |
| | Glass transition temperature [° C.] | 135 | 135 | 130 | 135 | 130 |
| | Shrinkage factor | 0.8 | 0.4 | 5 | 8 | 2 |

(2) Preparation of Dope:

The cellulose acylate and plasticizer as shown in Table 1 and the following retardation adjusting agent were thrown in a mixed solvent of dichloromethane/methanol (87 parts by mass/13 parts by mass) with stirring such that the mass concentration of cotton was 15% by mass, and the mixture was stirred for dissolution under heating. At that time, 0.05 parts by mass of a matting agent (silicon dioxide (primary particle size: 20 nm), Moh's hardness: about 7) as a fine particle based on 100 parts by mass of the cellulose acylate was thrown, and the mixture was stirred under heating to prepare a dope. In Table 1, the plasticizer A represents triphenyl phosphate; the plasticizer B represents biphenyldiphenyl phosphate; the plasticizer C represents dipropylene glycol dibenzoate; and the plasticizer D represents trimethylol tribenzoate.

Retardation Developing Agent A

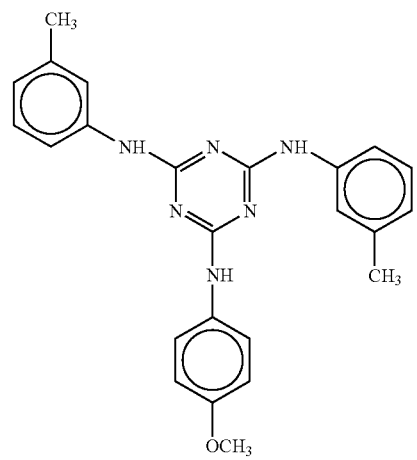

(3) Casting, Stretching, Drying and Heat Treatments:

The foregoing dope was cast by using a band casting machine. A film stripped off from the band was stretched in a width direction in a stretch ratio as shown in Table 1 by using a tenter. After the film had reached a stretch ratio as shown in Table 1, the film was left from the tenter. Furthermore, the film was dried while roll traveling. At that time, the amount of the residual solvent of the film was all less than 1% by mass in all of the cases. Next, the heat treatment was carried out at a temperature as shown in Table 1.

Finally, both ends of the film were cut off before a winding part so as to have a width of 2,000 mm and wound up as a rolled film having a length of 4,000 m.

(4) Evaluation of Physical Properties of Film:

With respect to the prepared cellulose ester film (optical compensation sheet), an Re(590) retardation value and an Rth(590) retardation value at a wavelength of 590 nm were measured at 25° C. and 60% RH by using an automatic birefringence meter (KOBRA 21ADH, manufactured by Oji Scientific Instruments). The results are shown in Table 1.

Also, after humidification at 25° C. and 10% RH and at 25° C. and 80% RH, respectively for 2 hours or more, the film was measured under that circumstance. At that time, the amount of change in retardation of the cellulose ester film from 80% RH to 10% RH was defined as ΔRe and ΔRth, respectively [ΔRe={Re(590) (10% RH)−Re(590) (80% RH)} and ΔRth={Rth(590) (10% RH)−Rth(590) (80% RH)}].

With respect to a shrinkage factor in a slow axis direction in the range of from a glass transition temperature to a temperature of 40° C. higher than a glass transition temperature, after humidifying a film sample (3 mm×35 mm) at 25° C. and 60% RH for 2 hours or more, the film length was measured every 10 seconds by using a thermo mechanical analyzer/stress strain, TMA/SS6100 (manufactured by SII Nano Technology Inc.) at a grasping distance of 25 mm and a temperature rise rate of 5° C./min in the measurement temperature range of from 30° C. to 200° C. at a load of 0.04 N, thereby calculating the shrinkage factor according to the following expression.

[{(Film length at a glass transition temperature)−
(Minimum film length in the range of from a
glass transition temperature to a temperature of
40° C. higher than a glass transition tempera-
ture)} /(Film length before measurement)]×100

The shrinkage factor of each of the films is shown in the foregoing Table 1. The case where the shrinkage was not observed is expressed as "0%".

As is clear from Table 1, the films 1 to 8 of the respective Examples of the cellulose ester film of the invention gave satisfactory results with respect to the ΔRe, ΔRth and shrinkage factor. On the other hand, the films 9 to 11 of the respective Comparative Examples gave unsatisfactory results with respect to the ΔRe, ΔRth and shrinkage factor.

[Preparation of Polarizing Plate]

A polyvinyl alcohol (PVA) film having a thickness of 80 μm was dyed by dipping in an iodine aqueous solution having an iodine concentration of 0.05% by mass at 30° C. for 60 seconds, longitudinally stretched 5 times the original length while dipping in a boric acid aqueous solution having a boric acid concentration of 4% by mass for 60 seconds and then dried at 50° C. for 4 minutes to obtain a polarizing film having a thickness of 20 μm.

Each of the films 1 to 11 as shown in Table 1 and a commercially available cellulose ester film, FUJITAC TD80UL (manufactured by Fujifilm Corporation, haze: 0.3%, unevenness in thickness: 0.7 μm) was dipped in 1.5 moles/liter of a sodium hydroxide aqueous solution at 55° C., and the sodium hydroxide was then thoroughly washed away with water. Thereafter, the resulting film was dipped in 0.005 moles/liter of a dilute sulfuric acid aqueous solution at 35° C. for one minute and then dipped in water, thereby thoroughly washing away the dilute sulfuric acid aqueous solution. Finally, the sample was thoroughly dried at 120° C.

A commercially available cellulose ester film having been subjected to a saponification treatment as described previously was stuck on one side of the foregoing polarizing film by using a polyvinyl alcohol based adhesive; and a film having been subjected to a saponification treatment as described previously was stuck on an opposite side of the foregoing polarizing film in a combination as shown in the following Table 2, thereby obtaining polarizing plates 1 to 11. Also, a commercially available cellulose ester film having been subjected to a saponification treatment on both sides of the foregoing polarizing plate was stuck on one side of the foregoing polarizing film by using a polyvinyl alcohol based adhesive, thereby obtaining a polarizing plate 12.

At that time, since the polarizing film and the passivation films on the both sides of the polarizing film are prepared in a rolled state, the respective rolled films are parallel in the longitudinal direction and continuously stuck. In the passivation film to be arranged on the cell side, the transmission axis of the polarizer and the slow axis of the cellulose ester film prepared in each of the Examples are parallel to each other.

An acrylic binding material was applied on a surface of the above-prepared polarizing plate on the cell side, and a separate film was further stuck on the binding material. A protect film was stuck on a surface of the opposite side to the cell.

(Sticking of Polarizing Plate onto Panel)

A polarizing plate and a phase different plate on the back and front of a liquid crystal television set of a VA mode (LC-37GE4, manufactured by Sharp Corporation) were stripped off; and the prepared polarizing plate was punched out in a 37-inch size in a combination as shown in Table 2 and stuck onto a liquid crystal cell. On that occasion, the arrangement was made in such a manner that the absorption axis of the polarizing plate on a viewing side is in a horizontal direction to the panel; the absorption axis of the polarizing plate on a backlight side is in a vertical direction to the panel; and the adhesive surface is arranged on a liquid crystal cell side.

With respect to the thus obtained liquid crystal displays, unevenness was evaluated by black displaying from the front side. The results are shown in Table 2. The evaluation was made according to the following criteria.

C: Mist-like unevenness is distinctly observed, and the film is not practically useful.

B: Mist-like unevenness is slightly observed.

A: Unevenness is not observed at all.

Brightness at the black displaying was measured at an azimuth angle of 45° on the basis of a lateral direction of the resulting liquid crystal display screen and in the azimuth of a polar angle of 60° on the basis of a normal direction of the screen surface under a circumstance at 25° C. and 60% RH by using an analyzer (EZ-Contrast 160D, manufactured by ELDIM) Furthermore, after standing at 25° C. and 60% RH for 24 hours, the same measurement was carried out, and a change in brightness at the black displaying was calculated. The results are shown in Table 2.

TABLE 2

| Liquid crystal display | Polarizing plate on front side | Polarizing plate on rear side | Evaluation of unevenness at black displaying | Change in black brightness after elapsing under high-temperature and high-humidity condition [cd/m$^2$] | Remark |
|---|---|---|---|---|---|
| LCD1 | Polarizing plate 1 | Polarizing plate 1 | A | 0.3 | Example |
| LCD2 | Polarizing plate 2 | Polarizing plate 2 | A | 0.0 | Example |
| LCD3 | Polarizing plate 3 | Polarizing plate 3 | A | 0.1 | Example |
| LCD4 | Polarizing plate 4 | Polarizing plate 4 | A | 0.2 | Example |
| LCD5 | Polarizing plate 5 | Polarizing plate 5 | A | 0.1 | Example |
| LCD6 | Polarizing plate 12 | Polarizing plate 6 | A | 0.5 | Example |
| LCD7 | Polarizing plate 7 | Polarizing plate 7 | A | 0.3 | Example |
| LCD8 | Polarizing plate 8 | Polarizing plate 8 | A | 0.2 | Example |
| LCD9 | Polarizing plate 9 | Polarizing plate 9 | C | 1.8 | Comparative Example |
| LCD10 | Polarizing plate 12 | Polarizing plate 10 | C | 1.3 | Comparative Example |
| LCD11 | Polarizing plate 11 | Polarizing plate 11 | C | 1.0 | Comparative Example |

As is clear from Table 2, it is noted that the liquid crystal displays of the respective Examples using the film of the invention are excellent in both unevenness and stability of viewing angle compensatory performance after elapsing under a high-temperature and high-humidity condition as compared with the liquid crystal displays of the respective Comparative Examples.

This application is based on Japanese Patent application JP 2006-313958, filed Nov. 21, 2006, the entire content of which is hereby incorporated by reference, the same as if fully set forth herein.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A process for producing a cellulose ester film comprising: a fabrication step of casting a solution having a cellulose ester dissolved in an organic solvent on a support and evaporating the solvent to form a cellulose ester film; a stretching step of subsequently stretching the film; and a drying step of drying the resulting film, which further comprises a step of, after completion of the drying step, performing a heat treatment at a temperature of from 150 to 200° C. for one minute or more, wherein the cellulose ester film has a front retardation Re of from 20 nm to 100 nm relative to light having a wavelength of 590 nm at 25° C. and 60% RH; a retardation Rth in a film thickness direction of from 60 nm to 400 nm relative to light having a wavelength of 590 nm at 25° C. and 60% RH; and a shrinkage factor in a slow axis direction of less than 1% in the range of from a glass transition temperature to a temperature of 40° C. higher than a glass transition temperature, wherein the cellulose ester film is for a VA mode.

2. The process for producing a cellulose ester film according to claim 1, wherein a stretch ratio of the film in the stretching step is from 1.2 to 2.0 times.

3. The process for producing a cellulose ester film according to claim 1, wherein in the heat treatment step, the film is stretched from 0.9 to 1.5 times in a width direction and a traveling direction of the film, respectively.

4. The process for producing a cellulose ester film according to claim 1, wherein the heat treatment is performed for 1 to 10 minutes.

5. The process for producing a cellulose ester film according to claim 1, wherein the heat treatment is performed for 1 to 5 minutes.

* * * * *